United States Patent
Kim et al.

(10) Patent No.: US 12,223,580 B2
(45) Date of Patent: Feb. 11, 2025

(54) INTERFACING METHOD AND APPARATUS FOR 3D SKETCH

(71) Applicant: SKETCHSOFT INC., Seoul (KR)

(72) Inventors: Yong Kwan Kim, Seoul (KR); Sang Gyun An, Seoul (KR); Kyu Hyoung Hong, Seoul (KR)

(73) Assignee: SKETCHSOFT INC., Seoul (KR)

( * ) Notice: Subject to any disclaimer, the term of this patent is extended or adjusted under 35 U.S.C. 154(b) by 35 days.

(21) Appl. No.: 17/600,073

(22) PCT Filed: Sep. 14, 2021

(86) PCT No.: PCT/KR2021/012470
§ 371 (c)(1),
(2) Date: Sep. 29, 2021

(87) PCT Pub. No.: WO2022/220344
PCT Pub. Date: Oct. 20, 2022

(65) Prior Publication Data
US 2022/0335676 A1  Oct. 20, 2022

(30) Foreign Application Priority Data
Apr. 16, 2021  (KR) .......... 10-2021-0049932

(51) Int. Cl.
*G06T 15/02* (2011.01)
*G06F 3/04815* (2022.01)

(52) U.S. Cl.
CPC .......... *G06T 15/02* (2013.01); *G06F 3/04815* (2013.01)

(58) Field of Classification Search
None
See application file for complete search history.

(56) References Cited

U.S. PATENT DOCUMENTS

2008/0246762 A1* 10/2008 Ogata ................ G06T 3/00
345/420
2008/0317387 A1* 12/2008 Berger ............... G06T 11/60
382/309
(Continued)

FOREIGN PATENT DOCUMENTS

CN    108304608 A   *  7/2018
KR  1020080069714 A      7/2008
(Continued)

OTHER PUBLICATIONS

Kwan, Kin Chung, and Hongbo Fu. "Mobi3dsketch: 3d sketching in mobile ar." Proceedings of the 2019 CHI Conference on Human Factors in Computing Systems, (Year: 2019).*

(Continued)

*Primary Examiner* — Diane M Wills
(74) *Attorney, Agent, or Firm* — Kolitch Romano Dascenzo Gates LLC

(57) ABSTRACT

Disclosed are an interfacing method and an apparatus for three-dimensional (3D) sketch. According to an example embodiment, the interfacing method for sketching in a virtual space of three dimensions includes determining a surface including an area in which a first user input is received in the virtual space to be a region of interest, controlling a position of the region of interest in the virtual space based on a second user input on the region of interest, and generating at least one sketch line belonging to the region of interest based on a third user input.

17 Claims, 17 Drawing Sheets

(56) References Cited

U.S. PATENT DOCUMENTS

| | | | |
|---|---|---|---|
| 2011/0164029 A1* | 7/2011 | King | G06T 19/00 |
| | | | 345/173 |
| 2013/0181986 A1* | 7/2013 | Fowler | G06T 17/30 |
| | | | 345/420 |
| 2014/0340388 A1 | 11/2014 | Tsang et al. | |
| 2015/0363980 A1* | 12/2015 | Dorta | G06F 3/04883 |
| | | | 345/419 |
| 2019/0034076 A1* | 1/2019 | Vinayak | G06T 19/20 |

FOREIGN PATENT DOCUMENTS

| | | | |
|---|---|---|---|
| KR | 1020090029447 A | | 3/2009 |
| KR | 20110129171 A | * | 5/2010 |
| KR | 1020110129171 A | * | 12/2011 |
| KR | 101661991 B1 | | 10/2016 |
| KR | 1020200122126 A | | 10/2020 |

OTHER PUBLICATIONS

Surale, Hemant Bhaskar, et al. "Tabletinvr: Exploring the design space for using a multi-touch tablet in virtual reality." Proceedings of the 2019 CHI Conference on Human Factors in Computing Systems. (Year: 2019).*

* cited by examiner

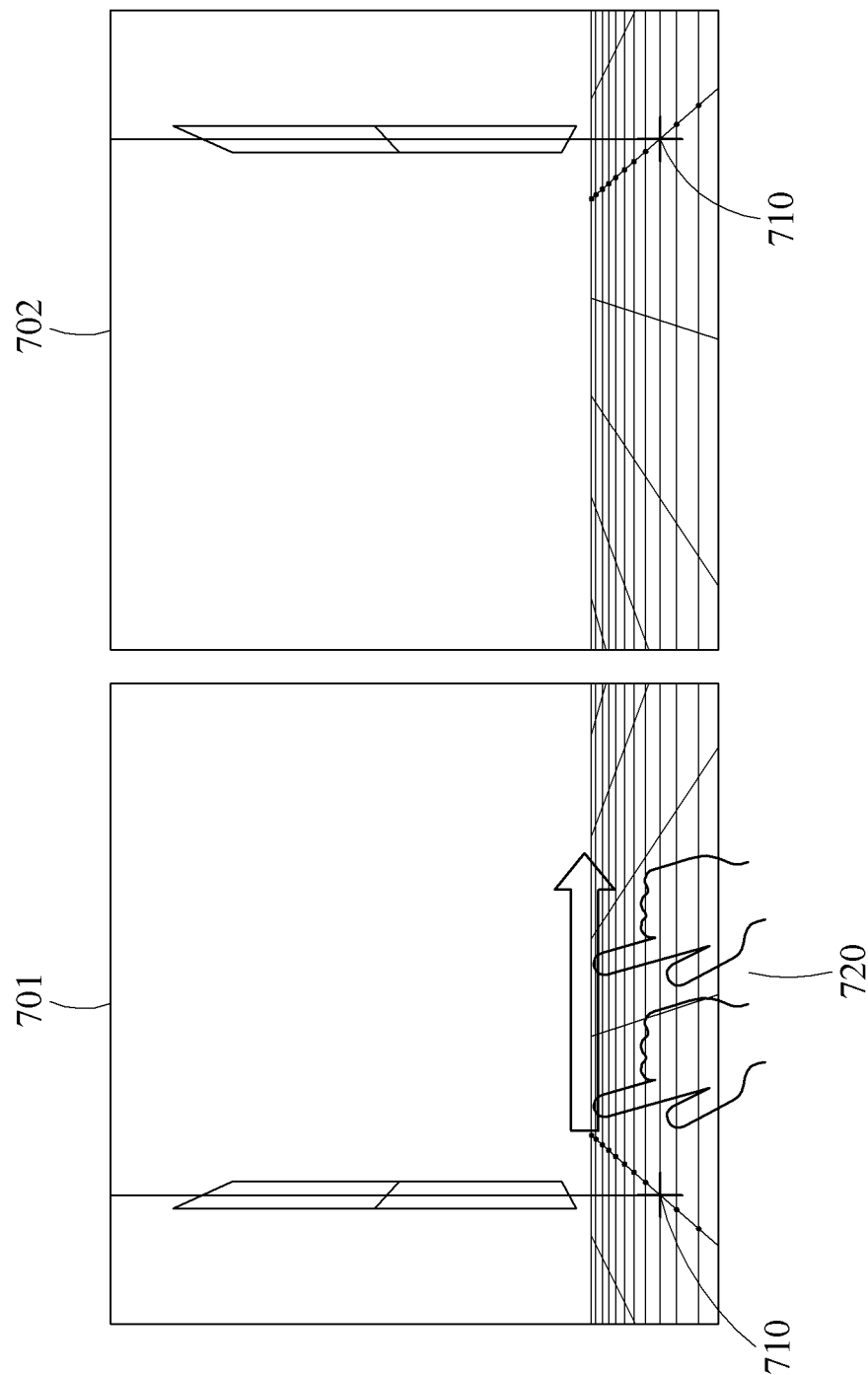

INTERFACING METHOD AND APPARATUS FOR 3D SKETCH

TECHNICAL FIELD

The following description relates to an interfacing method for three-dimensional (3D) sketch and an apparatus performing the interface method.

BACKGROUND ART

Three-dimensional (3D) modeling is a technology for storing 3D objects as data in a form that can be understood by a computer and expressing them digitally. In the field of computer graphics, the 3D modeling technology is used to describe an object in a real world through a 3D model created in a 3D virtual space or to create an appearance of an object in a virtual environment by modeling a physical environment. Recently, the 3D modeling has been spotlighted as a means of expression in the field of entertainment such as movies, animations, and advertisements, as well as a means of expression of art and design such as physical experimental simulations, architecture, and design. Accordingly, there is a desire for development of a user interface for intuitively and easily supporting a sketch for generating a 3D model through an electronic apparatus.

DISCLOSURE OF THE INVENTION

Technical Goals

An aspect provides a user interface for intuitively performing a sketch in a three-dimensional (3D) virtual space.

Technical goals of the present disclosure are not limited to the aforementioned technical goals, and other unstated technical goals may exist.

Technical Solutions

According to an aspect, there is provided an interfacing method for sketching in a virtual space of three dimensions, the interfacing method including determining a surface including an area in which a first user input is received in the virtual space to be a region of interest, controlling a position of the region of interest in the virtual space based on a second user input on the region of interest, and generating at least one sketch line belonging to the region of interest based on a third user input.

The controlling of the position of the region of interest may include at least one of rotating, based on the second user input, the region of interest in the virtual space about an axis for rotation set to correspond to the region of interest and rotating, based on the second user input, the region of interest in the virtual space about an axis for movement set to correspond to the region of interest.

The controlling of the position of the region of interest may include at least one of rotating, based on the second user input, the region of interest about an axis of a direction in which a reference viewpoint for projecting the virtual space faces a point of interest and moving, based on the second user input, the region of interest in a direction perpendicular to the axis of the direction in which the reference viewpoint for projecting the virtual space faces the point of interest.

The determining to be the region of interest may include determining, based on the first user input of selecting at least one point in the virtual space, a plane including the selected point to be the region of interest.

The determining to be the region of interest may include determining, based on the first user input of generating a curved line in the virtual space, a curved surface extending from the generated curved line to be the region of interest.

The determining to be the region of interest may include generating, based on the first user input of generating a first curved line in the virtual space, a curved surface extending from the generated first curved line in a direction of a first line and changing, based on a user input of generating a second line in the virtual space to correct the generated curved surface, the generated curved surface by changing the first line to the second line.

The determining to be the region of interest may include determining, based on the first user input of selecting at least one sketch line generated in the virtual space, a surface including the selected at least one sketch line to be the region of interest.

The at least one sketch line belonging to the region of interest may include at least one of a point, a line, and a surface drawn on the region of interest based on the third user input.

The interfacing method may further include selecting at least one sketch line included in the virtual space based on a fourth user input and linearly transforming the selected sketch line based on a point of interest in the virtual space set in accordance with a predetermined rule.

The linearly transforming of the selected sketch line may include linearly transforming the selected sketch line while maintaining a positional relationship between the region of interest and the selected sketch line based on a position control of the region of interest based on the second user input.

The position control of the region of interest based on the second user input may include an operation of rotating or moving the region of interest with respect to axes passing the point of interest in the region of interest based on the second user input.

The linearly transforming of the selected sketch line may include at least one of rotating, based on a fifth user input, the selected sketch line in the virtual space with respect to an axis of a direction in which a reference viewpoint for projecting the virtual space faces the point of interest, moving, based on the fifth user input, the selected sketch line in a direction perpendicular to the axis of the direction in which the reference viewpoint for projecting the virtual space faces the point of interest, and changing, based on the fifth user input, a size of the selected sketch line in the direction perpendicular to the axis of the direction in which the reference viewpoint for projecting the virtual space faces the point of interest.

The interfacing method may further include selecting at least one first sketch line included in the virtual space based on a fourth user input, generating a second sketch line by copying the selected first sketch line, and linearly transforming the second sketch line based on a point of interest in the virtual space set in accordance with a predetermined rule.

The interfacing method may further include selecting at least one sketch line included in the virtual space based on a fourth user input and deforming, based on a fifth user input, a shape of at least a portion of the selected sketch line based on a surface in the virtual space designated by a user.

The generating of the at least one sketch line belonging to the region of interest may include determining a symmetric plane on the virtual space based on a symmetric mode setting, generating a first sketch line belonging to the region of interest based on the third user input, and generating a second sketch line symmetrical to the first sketch line based on the symmetric plane in the virtual space.

The interfacing method may further include selecting at least one sketch line included in the virtual space based on a fourth user input, designating the selected at least one sketch line as a group, and setting a point of interest corresponding to the group.

The sketch line may include position information corresponding to the designated group based on a relative positional relationship with another sketch line included in the designated group.

The interfacing method may further include storing a first virtual space including the generated sketch line, storing a second virtual space including a sketch line obtained by linearly transforming at least a portion of the generated sketch line, and generating an image including a linear transformation process of at least a portion of the generated sketch line by rendering the first virtual space and the second virtual space.

The interfacing method may further include visualizing, when a sketch line included in the virtual space intersects with the region of interest, an intersecting point of the region of interest and the sketch line included in the virtual space in the region of interest.

According to another aspect, there is provided an interfacing method for sketching in a virtual space of three dimensions, the interfacing method including setting, based on a first user input for determining a region of interest in the virtual space, a point of interest corresponding to a region of interest including the selected point, controlling, based on a sixth user input, a reference viewpoint for projecting the virtual space based on the point of interest, and rendering a projection of the virtual space based on the reference viewpoint.

The controlling of the reference viewpoint may include linearly transforming, based on the sixth user input, a position of the reference viewpoint based on the point of interest.

The linearly transforming of the position of the reference viewpoint may include determining an actual amount of movement of the reference viewpoint based on an amount of movement indicated by the sixth user input and a distance between the point of interest and the reference viewpoint, and linearly transforming a position of the reference viewpoint with respect to the point of interest based on the determined actual amount of movement.

The actual amount of movement of the reference viewpoint may be determined to be large according to an increase of the distance between the point of interest and the reference viewpoint, to correspond to the same amount of movement indicated by the sixth user input.

The rendering of the projection of the virtual space may include at least one of rendering a perspective projection of the virtual space based on the reference viewpoint and rendering an orthographic projection of the virtual space based on the reference viewpoint.

The setting of the point of interest may include setting a predetermined point in the virtual space to be the point of interest.

The point of interest may include at least one of a predetermined point in the virtual space, a point determined based on at least a portion of sketch lines generated in the virtual space, a point determined based on the region of interest, and a point set based on an input of a user.

According to another aspect, there is provided an electronic apparatus including at least one processor configured to determine a surface including an area in which a first user input is received in a virtual space of three dimensions to be a region of interest, control a position of the region of interest in the virtual space based on a second user input on the region of interest, and generate at least one sketch line belonging to the region of interest based on a third user input.

According to another aspect, there is provided an electronic apparatus including at least one processor configured to set, based on a first user input for determining a region of interest in the virtual space, a point of interest corresponding to a region of interest including the selected point, control, based on a sixth user input, a reference viewpoint for projecting the virtual space based on the point of interest, and render a projection of the virtual space based on the reference viewpoint.

BRIEF DESCRIPTION OF DRAWINGS

FIGS. 5A through 7B are diagrams illustrating examples of an interface screen in which a viewport changed based on a user input for viewport control is displayed.

BEST MODE FOR CARRYING OUT THE INVENTION

Figure 1:
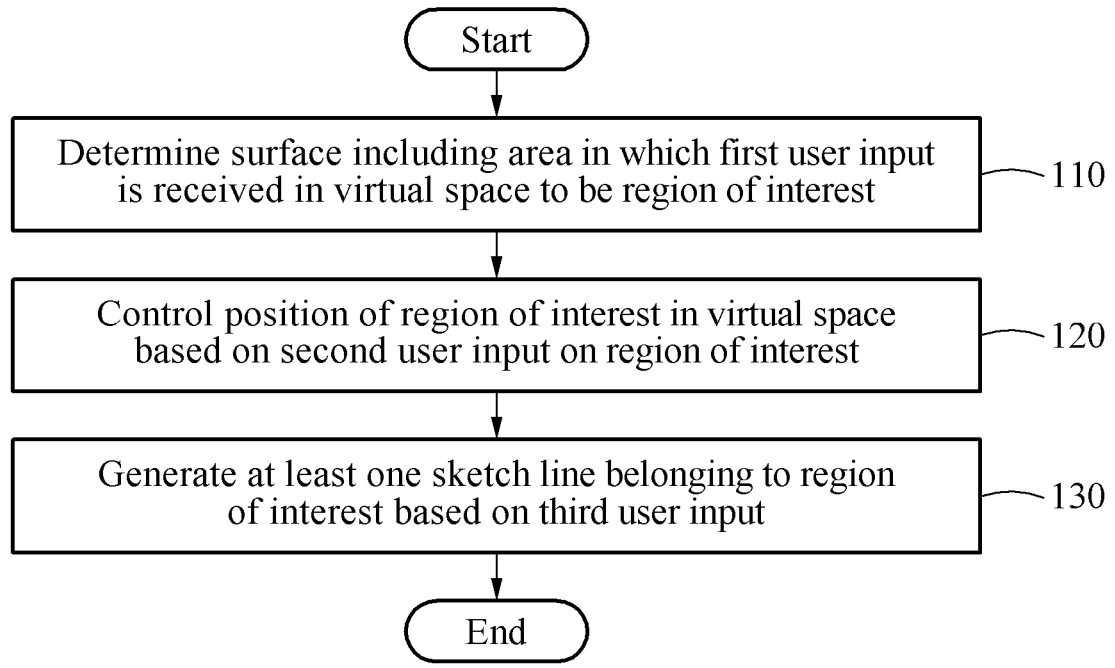
FIG. 1 is an operation flowchart illustrating an interfacing method for sketching in a three-dimensional (3D) virtual space according to an example embodiment.

The following structural or functional descriptions of example embodiments described herein are merely intended for the purpose of describing the example embodiments described herein and may be implemented in various forms. However, it should be understood that these example embodiments are not construed as limited to the illustrated forms. Here, the examples are not construed as limited to the disclosure and should be understood to include all changes, equivalents, and replacements within the idea and the technical scope of the disclosure.

Although terms of "first," "second," and the like are used to explain various components, the components are not limited to such terms. These terms are used only to distinguish one component from another component. For example, a first component may be referred to as a second component, or similarly, the second component may be referred to as the first component within the scope of the present disclosure.

When it is mentioned that one component is "connected" or "accessed" to another component, it may be understood that the one component is directly connected or accessed to another component or that still other component is interposed between the two components.

As used herein, the singular forms are intended to include the plural forms as well, unless the context clearly indicates otherwise. It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

Hereinafter, example embodiments will be described in detail with reference to the accompanying drawings. Regarding the reference numerals assigned to the elements in the drawings, it should be noted that the same elements will be designated by the same reference numerals, and overlapping descriptions thereof will be omitted.

FIG. 1 is an operation flowchart illustrating an interfacing method for sketching in a three-dimensional (3D) virtual space according to an example embodiment.

Referring to FIG. 1, an interfacing method for sketching in a virtual space of three dimensions may include operation 110 of determining a surface including an area in which a first user input is received in the virtual space to be a region of interest, operation 120 of controlling a position of the region of interest in the virtual space based on a second user input on the region of interest, and operation 130 of generating at least one sketch line belonging to the region of interest based on a third user input.

According to an example embodiment, the interfacing method may include operations performed in an electronic apparatus based on an interaction with a user through a user interface. The user interface may be provided to the user through an output device (e.g., device, head-mounted display (HMD)) of the electronic apparatus. The user interface may include an interfacing object that responds to a user input received through an input device (e.g., touch screen, mouse, keyboard) of the electronic apparatus. A configuration of the electronic apparatus that provides the user interface will be described in greater detail with reference to FIG. 17. The user interface may also be briefly referred to as an interface.

The interfacing method may include operations performed in response to a user input. The interface may support various types of user inputs. The user input may include at least one of a touch input, a button input, a key input, and a multimodal input but not be limited thereto. The touch input may correspond to a touch gesture made by the user touching a touch screen to control the electronic apparatus. The touch input may include various types of inputs classified based on at least one of a touch position, a touch trajectory, a touch speed, a touch intensity (or pressure) a touch duration, and a number of touch input points. For example, the touch input may include at least one of tapping, double-tapping, touch and hold, panning, swiping, flicking, dragging, pinch in/out, and rotating but not be limited thereto.

According to an example embodiment, the user input may be classified by an input method. The user input may be classified as, for example, a touch input by the skin, a touch input by a pen, a left-click input by a mouse, a right-click input by the mouse, an input by a mouse wheel, and a specific key input of a keyboard.

In addition, the user input may include an input corresponding to a predetermined area of the interface. For example, the user input may include an input of selecting a predetermined object included in the interface. Also, the user input may include an input of controlling a movement of a predetermined object included in the interface by indicating a specific trajectory in the interface.

According to an example embodiment, the user input or a combination of a plurality of user inputs may be mapped to an operation for sketching in a 3D virtual space displayed through the interface. When a user input mapped to a predetermined operation is received, the mapped operation may be performed. As an example, a touch input of tapping a first object included in the interface and drawing a predetermined trajectory in the interface may be mapped to an operation of drawing a line on the first object. As another example, a touch input of touching and holding the first object included in the interface and drawing a predetermined trajectory in the interface may be mapped to an operation of moving the first object along the predetermined trajectory.

According to an example embodiment, the interface may provide a projection of the 3D virtual space for the user to sketch. The sketching may be an operation of generating a visual shape using a point, a line, and a surface and include, for example, an operation of generating a shape of a line corresponding to a trajectory of a touch input received through the touch screen.

According to an example embodiment, the virtual shape may be generated in the 3D virtual space based on the user input. Also, a viewport which is a shape that the 3D virtual space including the generated visual shape is projected on a two-dimensional (2D) plane may be displayed on a display through the interface. A viewport is a 2D plane on which a shape of an object in a 3D space viewed from a predetermined viewpoint is projected, and may be understood as an image of a 3D space formed by a virtual camera placed at a predetermined position in the 3D virtual space. Hereinafter, a position of a virtual camera or a predetermined viewpoint for determining a viewport may be referred to as a reference viewpoint. For example, referring to FIG. 2A, a viewport may correspond to a 2D rectangular plane 203 on which a shape viewed from a reference viewpoint 201 in the 3D virtual space to a direction of an origin 202 is projected.

Figure 2B:
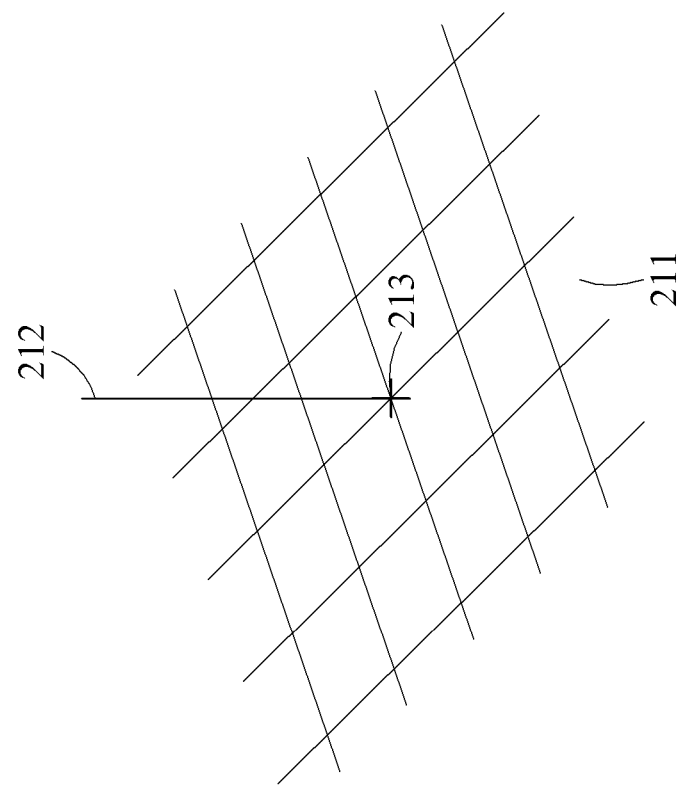
FIGS. 2A and 2B are diagrams for explaining a viewport in which a 3D virtual space is displayed on a display.
Figure 2A:
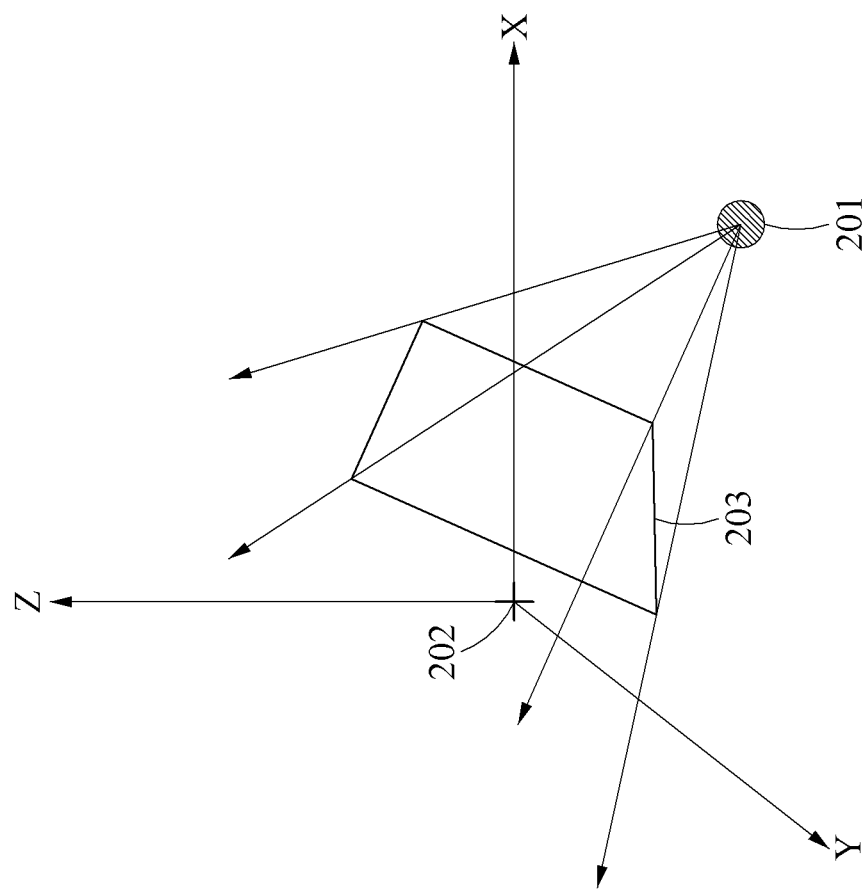

According to an example embodiment, a viewport may include an auxiliary line to visually express a 3D sense of space of the virtual space. For example, the sense of space may be expressed using a 3D grid or by expressing straight lines corresponding to three axes (e.g., x-axis, y-axis, and z-axis of orthogonal coordinate system) orthogonal to each other in the virtual space in a viewport of the 3D space. For example, the viewport of the 3D virtual space may be represented using 3D grids as shown in FIG. 2B. Referring to FIG. 2B, a plane 211 represented by grids may correspond to a plane (e.g., xy plane including origin in orthogonal coordinate system) of the 3D space, and an axis 212 may correspond to an axis (e.g., z-axis of orthogonal coordinate system) perpendicular to the plane 211. A point 213 on a plane of which an axis is represented in an initial state before a user input is received may correspond to a predetermined point (e.g., origin) in the 3D space.

<Viewport Control>

According to an example embodiment, a viewport may be determined based on a position in the virtual space of the reference viewpoint facing a point of interest in the virtual space. According to an example embodiment, the interfacing method may include a method of controlling a viewport representing the 3D virtual space based on a user input. In other words, the viewport representing the 3D virtual space may be controlled based on an input of a user. Controlling the viewport may be understood as changing a position of the reference viewpoint facing the point of interest in the virtual space. Hereinafter, a user input for controlling a viewport may be referred to as a sixth user input.

Figure 3:
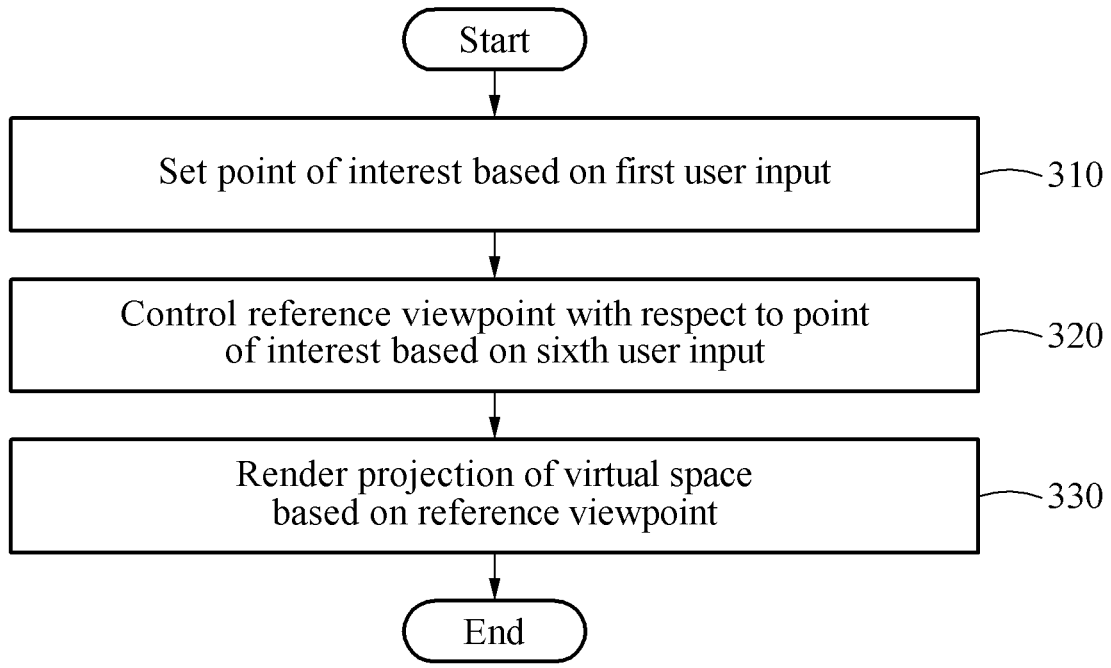
FIG. 3 is an operation flowchart illustrating an interfacing method for controlling a viewport according to an example embodiment.

An interfacing method for controlling the viewport according to an example embodiment will be described with reference to FIG. 3. Referring to FIG. 3, the interfacing method for controlling the viewport according to an example embodiment may include operation 310 of setting a point of interest based on a first user input, operation 320 of controlling a reference viewpoint with respect to the point of interest based on a sixth user input, and operation 330 of rendering a projection of a virtual space based on the reference viewpoint.

According to an example embodiment, the point of interest may correspond to a point in the virtual space corresponding to a position that the reference viewpoint faces. For example, referring to FIG. 2A, when the reference viewpoint 201 is set to face the origin 202, the origin 202 corresponds to the point of interest. According to an example embodiment, the point of interest may include at least one of a predetermined point in the virtual space, a point determined based on sketch lines generated in the virtual space, a point determined based on a region of interest, and a point set based on an input of a user.

Referring back to FIG. 3, according to an example embodiment, operation 310 of setting the point of interest may include an operation of setting the predetermined point in the virtual space to the point of interest. As an example, in an initial state before a user input is received, the point of interest may be determined to be a predetermined point (e.g., origin) in the 3D virtual space. As another example, when no region of interest is determined, a point in the virtual space corresponding to a center of a viewport may be determined to be the point of interest.

According to an example embodiment, the point of interest may be determined based on at least a portion of sketch lines generated in the virtual space. For example, the point of interest may be determined based on all the sketch lines generated in the virtual space and may also be determined based on some sketch lines selected from the sketch lines generated in the virtual space. For example, the point of interest may be determined based on a center of gravity of the sketch lines generated in the virtual space and may also be determined based on a center of a recently generated sketch line.

According to an example embodiment, the point of interest may be determined based on the region of interest. For example, when the region of interest is determined, a point according to a predetermined reference in the region of interest may be determined to be the point of interest. When the region of interest is not determined, a point according to a predetermined reference in a surface that is recently determined as the region of interest may be determined to be the point of interest. The point of interest based on the region of interest is described below.

According to an example embodiment, the point of interest may be determined to be a point set based on an input of a user. According to an example embodiment, a specific condition may be required to determine the point of interest to be a point selected by a user based on an input of the user instead of setting the point of interest automatically. For example, when the region of interest is not determined in the virtual space, the point of interest may be determined to be a point in the virtual space selected by a user based on an input of the user. When at least one sketch line included in the virtual space is selected for control, the point of interest may be determined to be a point in the virtual space selected by a user based on an input of the user. An operation of selecting a sketch line as a target for control and an operation of setting the point of interest when a sketch line is selected for control will be described below.

According to an example embodiment, operation 320 of controlling the reference viewpoint may include an operation of linearly transforming a position of the reference viewpoint with respect to the point of interest based on a sixth user input. Here, an input of a user is an input for controlling a viewport and may include, for example, an input for rotating an object displayed in a viewport, an input for zooming in or zooming out the object displayed in the viewport, and an input for moving the object displayed in the viewport.

According to an example embodiment, the operation of linearly transforming the position of the reference viewpoint may include an operation of linearly transforming a vector determined based on the reference viewpoint and the point of interest in the 3D virtual space based on the sixth user input for controlling the viewport. For example, linear transformation may include translational transformation and rotational transformation based on a specific axis. Also, the sixth user input may include at least one of an input for rotating an object displayed in a viewport, an input for zooming in or zooming out the object displayed in the viewport, and an input for moving the object displayed in the viewport.

Figure 4:
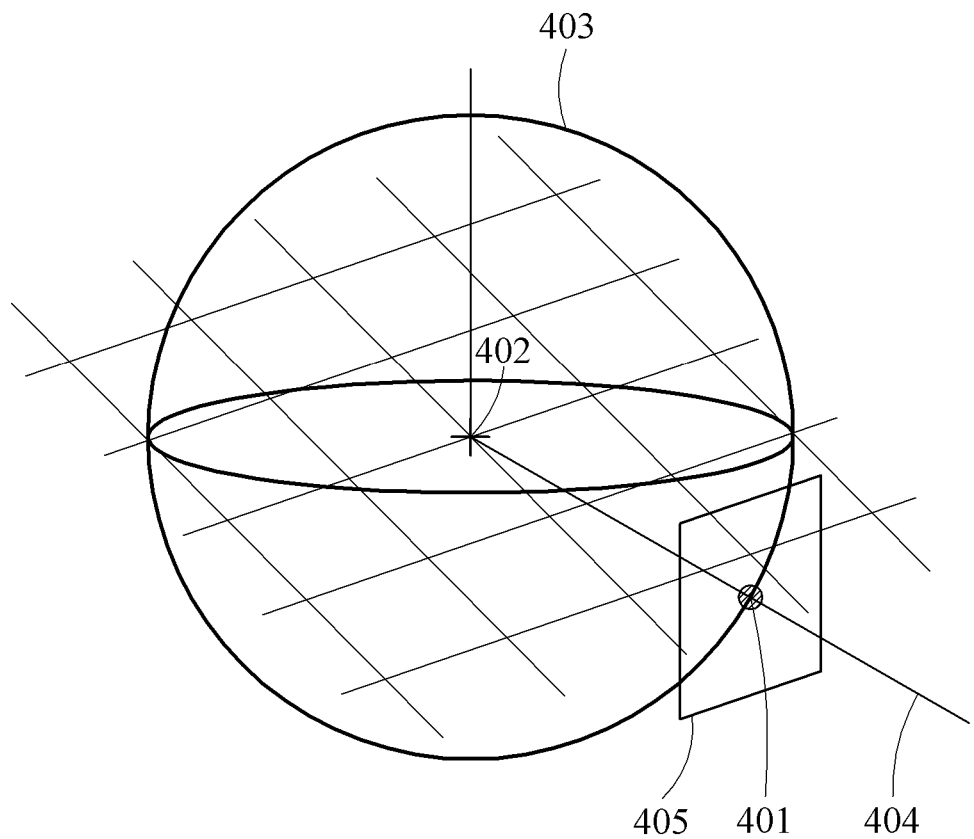
FIG. 4 is a diagram for explaining an operation of changing a position of a reference viewpoint based on a viewport control according to an example embodiment.

For example, based on the sixth user input for rotating the object displayed on the viewport, a position of the reference viewpoint may be rotationally transformed based on the point of interest. Referring to FIG. 4, based on the input for rotating the object displayed in the viewport, a position of a reference viewpoint 401 may be changed along a spherical surface 403 formed based on a point of interest 402.

For example, based on the sixth user input for zooming in or zooming out the object displayed in the viewport, the position of the reference viewpoint may be transformed to be closer to or farther from the point of interest while a direction facing the point of interest is maintained. Referring to FIG. 4, based on the input for zooming in the object displayed in the viewport, the position of the reference viewpoint 401 may be changed to a position to be closer to the point of interest 402 along an axis 404 on the reference viewpoint 401 and the point of interest 402. Also, based on the input for zooming out the object displayed in the viewport, the position of the reference viewpoint 401 may be changed to a position to be farther from the point of interest 402 along the axis 404.

For example, based on the sixth user input for moving the object displayed in the viewport, the position of the reference viewpoint may be translationally transformed on a plane perpendicular to a direction of the point of interest. Referring to FIG. 4, based on the input for moving the object displayed in the viewport, the position of the reference viewpoint 401 may be changed to a position translated on a plane 405 perpendicular to the axis 404 on the reference viewpoint 401 and the point of interest 402.

According to an example embodiment, the sixth user input for controlling the viewport may include an input of directly controlling a viewpoint of the virtual space and may also include an intuitive input applied to an area of the viewport. The input of controlling the virtual space may include, for example, an operation of inputting a position of a viewpoint in the virtual space displayed in the viewport as 3D coordinates. The input applied to an area of the viewport may include, for example, a touch input such as dragging, pinch-in/out, and touch-and-hold applied to a touchscreen on which the viewport is displayed.

Figure 5A:
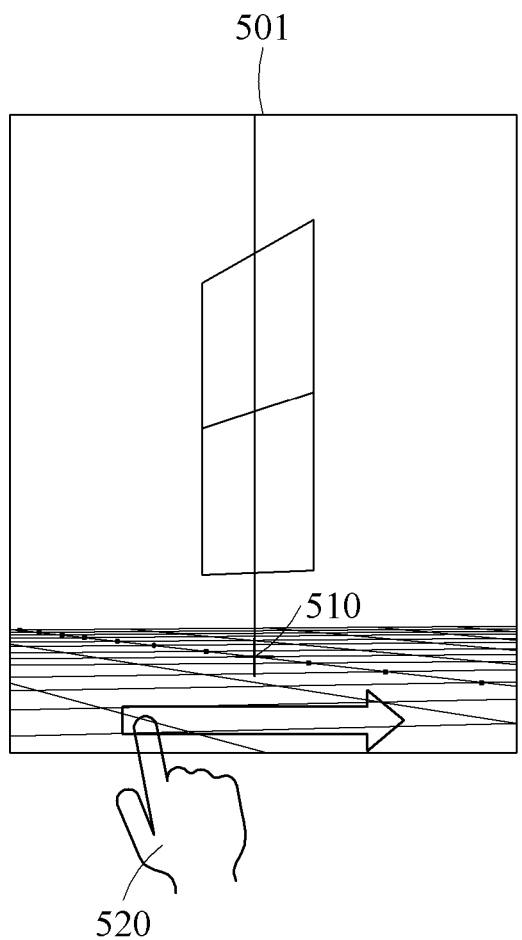
Figure 5B:
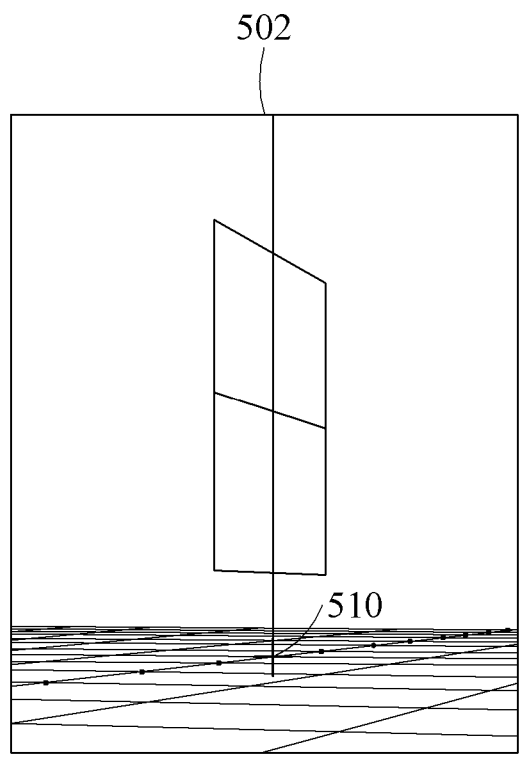

For example, a user may rotate the object displayed in the viewport by a touch input of dragging in a predetermined direction through the touchscreen on which the viewport is displayed. FIGS. 5A and 5B show a viewport 502 rotated counterclockwise based on a point of interest 510 by a drag input 520 applied in a right direction to an area of a viewport 501.

Figure 6C:
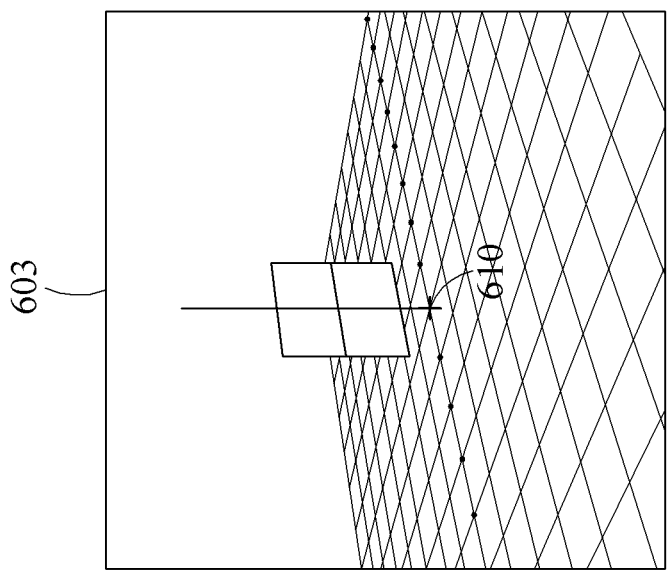
Figure 6B:
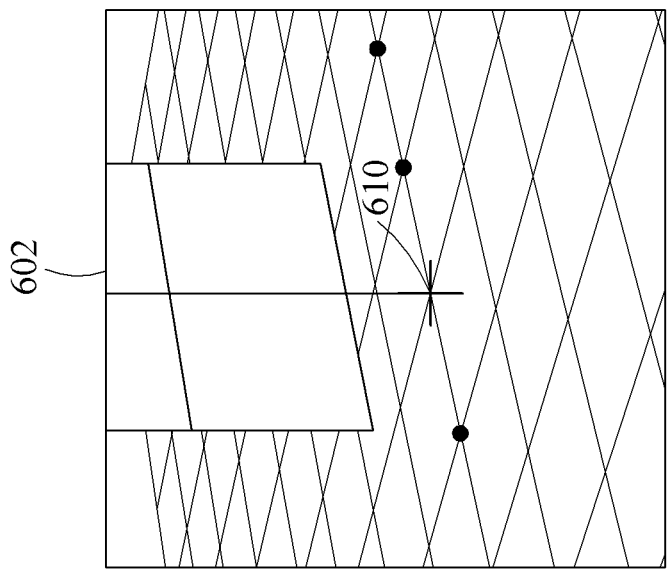
Figure 6A:
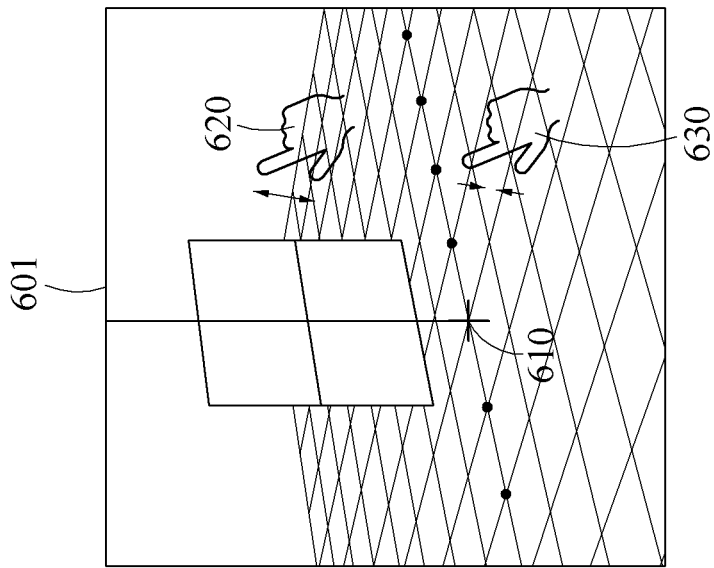

For example, a pinch-in or pinch-out input may be used to enlarge or retract an object displayed in the viewport. FIGS. 6A through 6C show a viewport 602 zoomed-in through a pinch-out input 620 on an area of a viewport 601 and show a viewport 603 zoomed-out through a pinch-in input 630 on the area of the viewport 601. According to an example embodiment, the viewport 601 may be zoomed in or zoomed out based on a point of interest 610. According to an example embodiment, unless the point of interest is changed, a position of the point of interest 610 may be constantly maintained in the viewport 601, the zoomed-in viewport 602, and the zoomed-out viewport 603.

For example, a touch-and-hold input applied in a predetermined direction may be used to move the object displayed in the viewport. Referring to FIGS. 7A and 7B, a viewport 702 may be translated in the right direction through a drag input 720 applied in the right direction based on two input points to an area of a viewport 701. According to an example embodiment, positions at which a point of interest 710 of the same position in the virtual space is displayed in the viewports 701 and 702 may be changed by an input of moving the object displayed in the viewport.

According to an example embodiment, the sixth user input may indicate a movement direction and an amount of movement. For example, the sixth user input may include an input of dragging a mouse from left to right by a predetermined distance and an input of dragging a touchscreen downward to a predetermined distance. According to an example embodiment, a movement direction and an amount of movement of a position of the reference viewpoint may be determined based on the movement direction and the amount of movement indicated by the sixth user input.

According to an example embodiment, the operation of linearly transforming the position of the reference viewpoint may include an operation of determining an actual amount of movement of the reference viewpoint based on a distance between the point of interest and the reference viewpoint and the amount of movement indicated by the sixth user input, and an operation of linearly transforming the position of the reference viewpoint with respect to the point of interest based on the determined actual amount of movement and the movement direction indicated by the sixth user input. The amount of movement of the position of the reference viewpoint may be determined based on the distance between the reference viewpoint and the point of interest as well as the sixth user input. In other words, the actual amount of movement of the position of the reference viewpoint linearly transformed based on the sixth user input may be determined based on the amount of movement indicated by the sixth user input and the distance between the reference viewpoint and the point of interest.

According to an example embodiment, the actual amount of movement of the position of the reference viewpoint may be determined to be larger as the distance between the point of interest and the reference viewpoint increases, based on the same amount of movement indicated by the sixth user input. As an example, in response to the sixth user input of two centimeters (cm)-dragging a touchscreen displaying the virtual space being received, the actual amount of movement of the reference viewpoint rotationally transformed based on the point of interest may be determined to be larger when the distance between the point of interest and the reference viewpoint is relatively large compared to when the distance between the point of interest and the reference viewpoint is relatively short. As another example, in response to the sixth user input of 2 cm-pinching out the touchscreen displaying the virtual space being received, the actual amount of movement of the reference viewpoint moving in the direction of the point of interest may be determined to be larger when the distance between the point of interest and the reference viewpoint is relatively large compared to when the distance between the point of interest and the reference viewpoint is relatively short. In other words, a degree of zooming-in due to the sixth user input of 2 cm-pinching out may be determined to be larger when the distance between the point of interest and the reference viewpoint is relatively large compared to when the distance between the point of interest and the reference viewpoint is relatively short.

According to an example embodiment, the reference viewpoint of the virtual space may be changed based on the input applied to the area of the viewport, and a viewport of the virtual space corresponding to the changed reference viewpoint may be displayed on a display.

According to an example embodiment, the operation of rendering the projection of the virtual space may include at least one of an operation of rendering a perspective projection of the virtual space based on the reference viewpoint and an operation of rendering an orthographic projection of the virtual space based on the reference viewpoint.

The projection is a technique for displaying a 3D space on a 2D plane and may be divided into the perspective projection and a parallel projection based on a projection method.

Figure 8B:
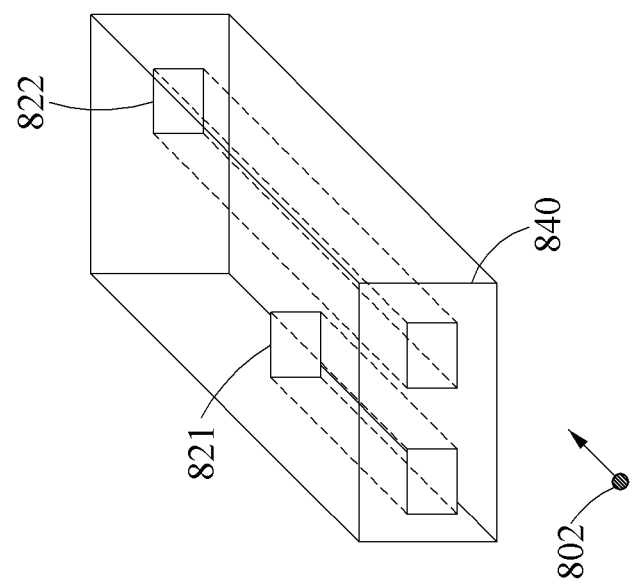
FIGS. 8A and 8B are diagrams for explaining perspective projection and orthographic projection.
Figure 8A:
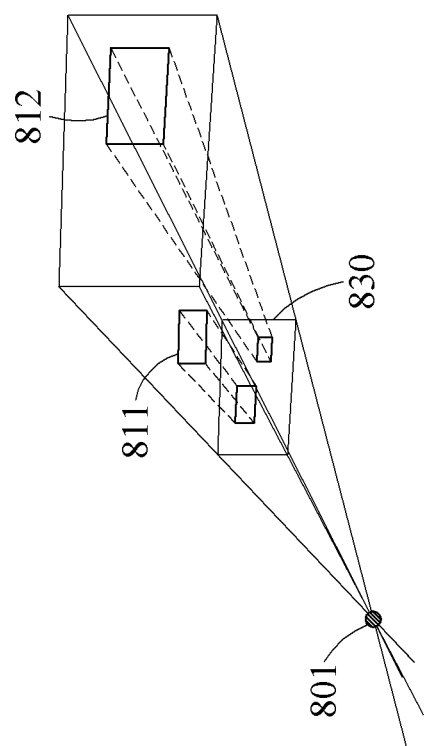

The perspective projection is a projection method of displaying, on a projection surface, a shape that a 3D object is viewed at one reference viewpoint in a 3D space. In the perspective projection, an object apart from the reference viewpoint may be displayed to be small on the projection surface. In contrast, an object close to the reference viewpoint may be displayed to be large on the projection surface. As such, the perspective between 3D objects and a viewpoint may be reflected. For example, FIG. 8A shows a projection surface 930 on which objects 811 and 812 in the 3D space are perspective-projected at a reference viewpoint 801. Referring to FIG. 8A, the object 812 apart from the reference viewpoint 801 may be greater in actual size than the object 811 close to the reference viewpoint 801. However, since the perspective is applied to the projection surface 830, the object 812 may be displayed smaller than the object 811.

The parallel projection is projecting a 3D object onto the projection surface at a predetermined angle. In the parallel projection, since all projection lines are parallel, a relative size may be maintained irrespective of the perspective. As an example of the parallel projection, there is an orthographic projection in which one of x, y, and z axes in a coordinate system of the 3D space is the same as a projection direction and a projection surface is perpendicular to the corresponding axis. For example, FIG. 8B shows a projection surface 840 on which objects 821 and 822 in the 3D space are orthographically projected based on an axis corresponding to a reference viewpoint 802. Referring to FIG. 8B, irrespective of positions of the objects 821 and 822 on a reference axis, the objects 821 and 822 may be displayed on the projection surface 840 while relative sizes of the objects 821 and 822 are maintained.

According to an example embodiment, based on a user input for switching the projection method of the viewport, the virtual space may be switched from the perspective-projected viewport to the orthographic-projected viewport, or switched in the other way. For example, based on a double-tapping touch input, the virtual space may be switched from the perspective-projected viewport to the orthographic-projected viewport.

According to an example embodiment, when a user input of switching to the orthographic projection is received in a state in which the viewport perspective-projected at the reference viewpoint is displayed, a direction of the orthographic projection may be determined to be a direction of an axis close to the position of the reference viewpoint, and a viewport orthographic-projected in the direction of the corresponding axis may be displayed.

Figure 9A:
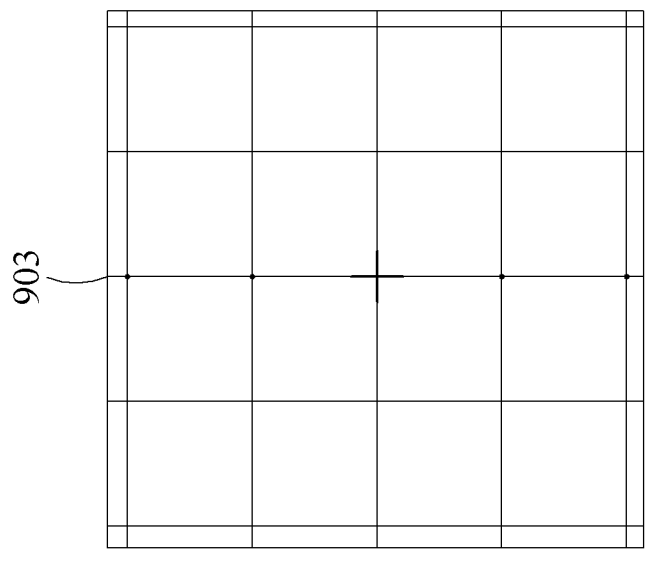
FIGS. 9A through 9C are diagrams illustrating examples of an interface screen on which an orthogonally projected viewport is displayed.
Figure 9B:
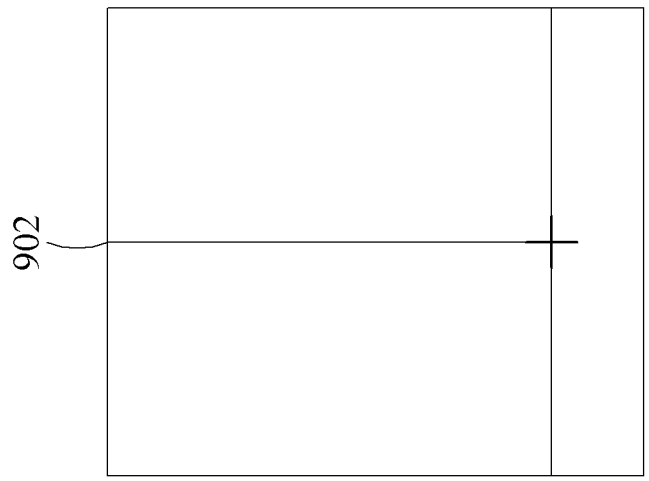
Figure 9C:
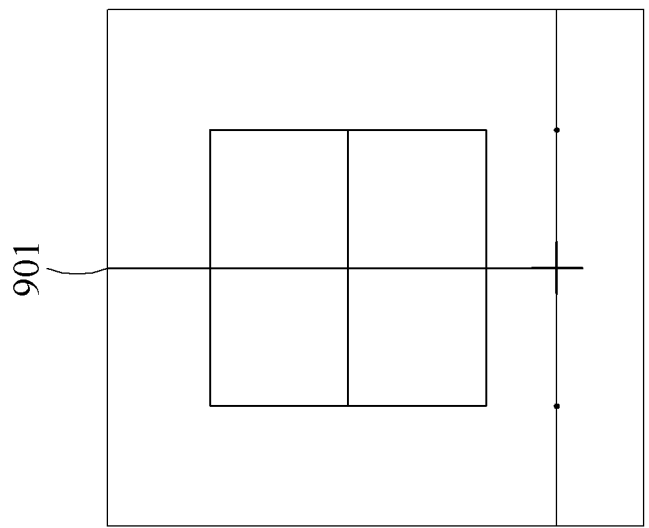

For example, referring to FIGS. 9A through 9C, when the reference viewpoint of the perspective-projected viewport is close to the x axis, the viewport may be switched to a viewport 901 orthographic-projected in an x-axial direction through an input (e.g., double-tapping) of switching the viewport to the orthographic projection. Also, the viewport may be switched to a viewport 902 orthographic-projected in a y-axial direction when the reference viewpoint is close to the y axis and may be switched to a viewport 903 orthographic-projected in a z-axial direction when the reference viewpoint is close to the z axis.

<Determining a Region of Interest>

An operation of determining a region of interest in a 3D virtual space through an interface is described with reference to FIG. 1 again. In operation 110, the first user input may include a user input for determining the region of interest. The first user input may be received to correspond to a predetermined area of the virtual space. For example, the first user input may include an input of touching or clicking a predetermined area in the virtual space through the interface.

According to an example embodiment, a surface including an area in which the first user input is received may be determined to be the region of interest. The region of interest may be determined to be a surface in the 3D virtual space. Here, the surface may include a plane and a curved surface. Although the surface corresponds to a 2D object geometrically, the surface determined as the region of interest based on the first user input may be represented by 3D coordinates in the 3D virtual space.

According to an example embodiment, operation 110 of determining to be the region of interest may include an operation of determining, based on the first user input of selecting at least one point in the virtual space, a plane including the selected point to be the region of interest. For example, referring to FIG. 10A, the first user input may include an input of selecting a predetermined point 1001 in the virtual space displayed in the interface. According to an example embodiment, the selected point 1001 may be determined based on an area in which the first user input is received. For example, when the first user input is received in a form of a touch input to a predetermined area, a point close to the area may be selected to correspond to the first user input.

According to an example embodiment, the region of interest may be determined based on the point selected by the first user input. For example, referring to FIG. 10B, a plane 1012 including a selected point 1011 may be determined to be the region of interest. According to an example embodiment, to visually express the plane determined as the region of interest, a visual mark may be added to the corresponding plane. For example, referring to FIG. 10B, a quadrangular object may be added to the determined plane 1012 so that the plane determined as the region of interest is visually expressed through the interface. In this case, a range of the region of interest is not limited to the indicated quadrangle area. An embodiment for visually expressing the region of interest is not limited to the example of FIG. 10B, and various methods may be used to visually express the determined region of interest.

According to an example embodiment, the first user input may include an input of selecting one or more points. For example, three points may be selected through a touch input applied three times to a predetermined area in the virtual space.

According to an example embodiment, when a plane including a predetermined point in the 3D virtual space is not specified as a single plane, one of planes including the predetermined point may be determined to be the region of interest. For example, referring to FIG. 10B, when a single point 1011 is selected based on the first user input, the plane 1012 that includes the selected point 1011 and is parallel with an xy plane may be determined to be the region of interest. For example, when two or more points on the same straight line are selected based on the first user input, a plane that includes the straight line formed by the two or more selected points and is parallel with one of the xy plane, an yz plane, and a zx plane may be determined to be the region of interest.

Figure 10B:
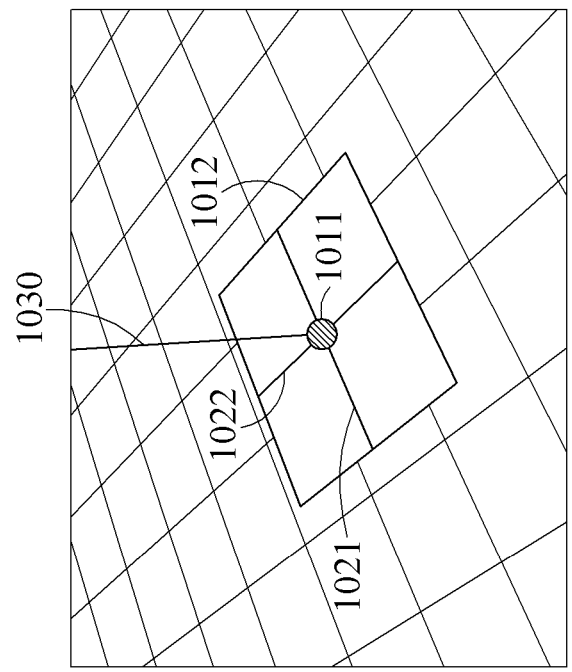
FIGS. 10A through 11B are diagrams for explaining an operation of determining a region of interest based on a user input according to an example embodiment.
Figure 10A:
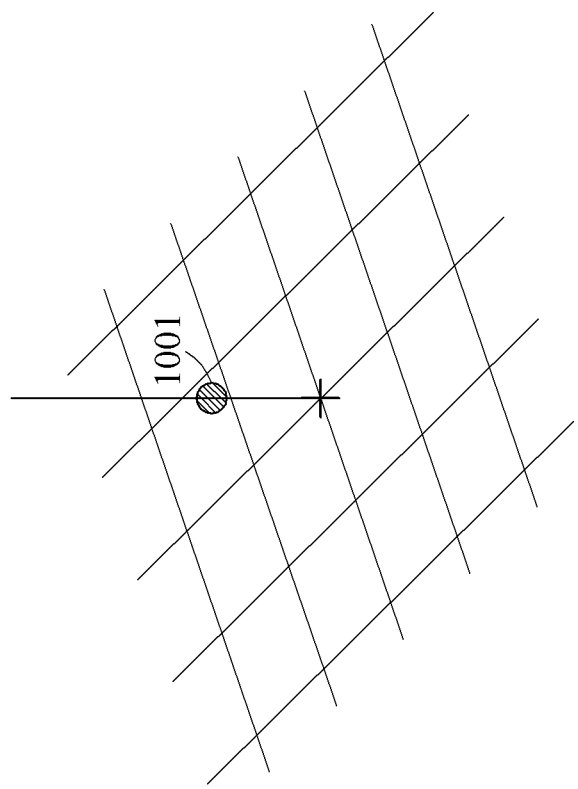

According to an example embodiment, after a first plane including a first point selected based on the first user input is determined as the region of interest, a second point may be additionally selected based on the first user input. In this case, the region of interest may be redetermined to be a second plane passing the first point and the second point. For example, referring to FIG. 11A, a second plane 1102 may be determined to be a plane to which the first plane 1012 of FIG. 10B is transformed to pass the first point 1011 and a second point 1101. The first point 1011 of FIG. 11A may correspond to the point 1011 of FIG. 10B.

Figure 11A:
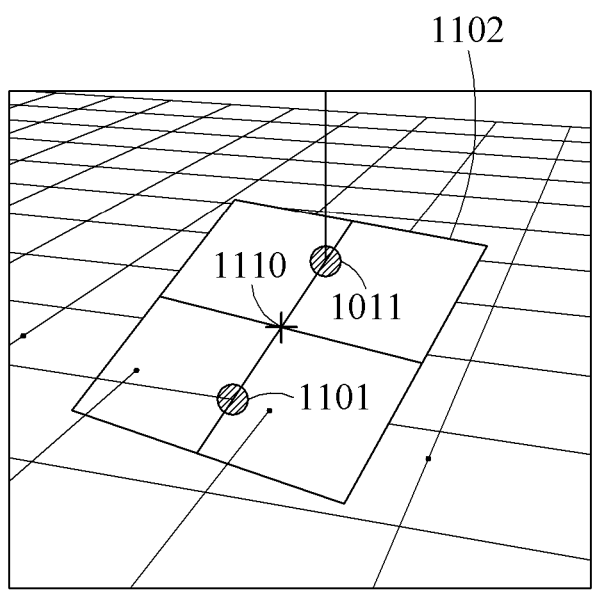

According to an example embodiment, after a second plane including a first point and a second point selected based on the first user input is determined as the region of interest, a third point may be additionally determined based on the first user input. In this case, the region of interest may be determined to be a third plane passing the first point, the second point, and the third point. For example, referring to FIG. 11B, a third plane 1112 may be determined to be a plane to which the second plane 1102 of FIG. 11A is transformed to pass the first point 1011, the second point 1101, and a third point 1111. The first point 1011 and the second point 1101 of FIG. 11B may correspond to the same points as the first point 1011 and the second point 1101 of FIG. 11A. According to an example embodiment, when the third point corresponds to a point on a straight line passing the first point and the second point, the third plane may be the same as the second plane.

According to an example embodiment, in a case in which four or more points are selected based on the first user input and a plane including the selected points is not determined, the case may be processed as exceptional. According to an example embodiment, the number of points selected based on the first user input may be limited to three or fewer.

According to an example embodiment, when the region of interest is determined, the point of interest may be determined based on the region of interest. As described above, the point of interest may correspond to a point in the virtual space corresponding to a position at which the reference viewpoint faces the viewport, and the viewport may be controlled with respect to the point of interest based on the user input. According to an example embodiment, the point of interest may be set to a predetermined point in the virtual space as a default before the region of interest is determined, and changed to a point determined based on the region of interest after the region of interest is determined.

Figure 11B:
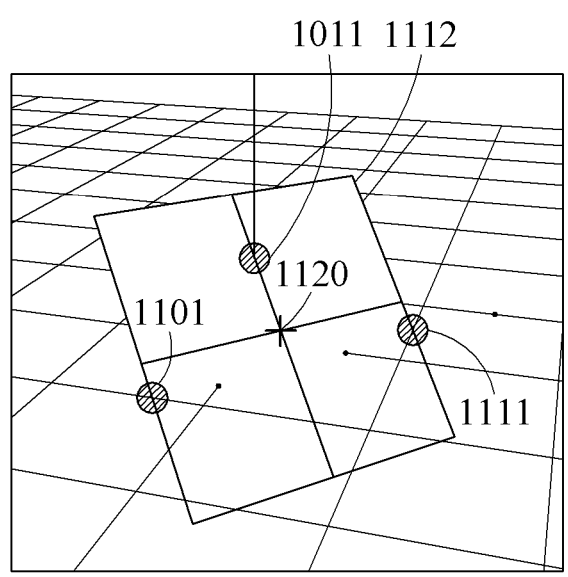

According to an example embodiment, the point of interest may be determined in the region of interest based on a point selected by the first user input. As an example, when one point is selected by the first user input, the point of interest may be set to the point selected by the first user input. Referring to FIG. 10B, the point 1101 selected by a user may be set to be the point of interest. As another example, when two or more points are selected by the first user input, a center of gravity of the selected points may be set to be the point of interest. Referring to FIG. 11A, a point of interest 1110 may correspond to a center of two points 1101 and 1011 selected by the first user input. Referring to FIG. 11B, a point of interest 1120 may correspond to a center of gravity of three points 1101, 1011, and 1111 selected by the first user input.

Referring back to FIG. 1, a position of the region of interest determined in operation 110 may be controlled based on a second user input. The position of the region of interest may be determined based on a distance to a predetermined point (e.g., origin of 3D space represented by orthogonal coordinate system) in the virtual space and/or an angle with respect to a predetermined axis (e.g., x, y, or z axis of 3D space represented by orthogonal coordinate system) in the virtual space.

According to an example embodiment, the second user input may include a user input for controlling the region of interest. The second user input may be received to correspond to the region of interest of the virtual space. As an example, the second user input may include an input of touching, dragging, or clicking a predetermined area (axis related to region of interest) in the region of interest through the interface. As another example, the second user input may include an input of selecting a surface generated in the virtual space as the region of interest, and an input of touching, dragging, or clicking an interfacing object for controlling the region of interest displayed in the interface in response to the region of interest being selected.

Operation 120 of controlling a position of the region of interest based on the second user input may include at least one of an operation of rotating the region of interest in the virtual space about an axis for rotation set to correspond to the region of interest based on the second user input, and an operation of rotating the region of interest in the virtual space about an axis for movement set to correspond to the region of interest based on the second user input. In other words, the region of interest may be rotated or moved about a predetermined axis based on a position at which the second user input is received. The axis for rotation or movement of the region of interest may be determined to be at least one straight line included in the virtual space. For example, the axis for rotating the region of interest may be determined to be a straight line included in a plane determined as the region of interest. For example, the axis for moving the region of interest may be determined to be a straight line perpendicular to the region of interest.

According to an example embodiment, at least one axis may be determined on the region of interest based on a point selected to determine the region of interest. For example, two straight lines orthogonal based on the point of interest set in the region of interest may be determined to be the axis for rotation of the region of interest. For example, a straight line perpendicular to the region of interest and passing the point of interest may be determined to be the axis for movement of the region of interest.

For example, referring to FIG. 10B, two straight lines 1021 and 1022 orthogonal based on the point 1011 of interest in the plane 1012 determined as the region of interest may be determined to be the axis for rotation, and a straight line 1030 passing the point of interest and perpendicular to the region of interest may be determined to be the axis for movement of the region of interest. As illustrated in FIG. 10B, the axis for rotation of the region of interest may be determined to be axes parallel to the x and y axes when the region of interest is projected on the xy plane of the virtual space, but not be limited thereto.

Referring back to FIG. 1, operation 120 may include an operation of determining one axis corresponding to an area in which the second user input is received among axes determined in the region of interest and an operation of rotating or moving the region of interest based on the determined axis. The area in which the second user input is received may include a partial area in the region of interest. Based on the area in which the second user input is received, one of the axes determined for rotation or movement of the region of interest may be determined.

Figure 12A:
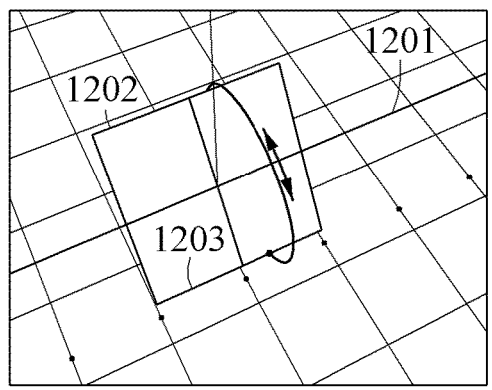
FIGS. 12A through 12D are diagrams for explaining an operation of controlling a position of a region of interest based on a user input according to an example embodiment.
Figure 12B:
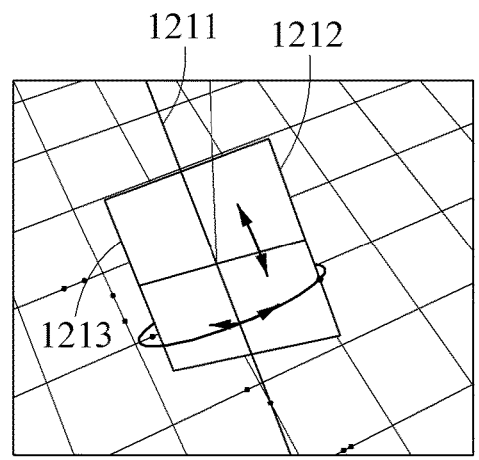
Figure 12C:
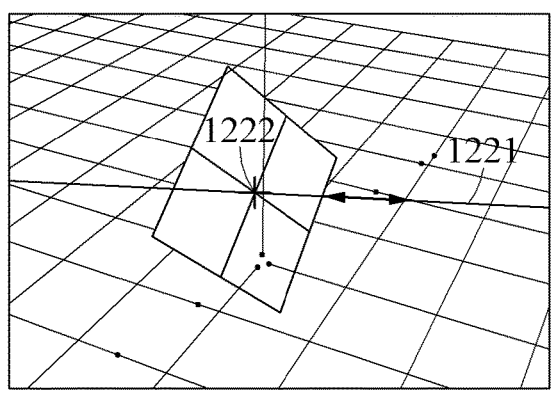

For example, referring to FIG. 12A, when the area in which the second user input is received corresponds to an edge 1202 or 1203 in the region of interest parallel to a first axis 1201 determined for rotation of the region of interest, the region of interest may be rotated based on the first axis 1201. Referring to FIG. 12B, when the area in which the second user input is received corresponds to an edge 1212 or 1213 parallel to a second axis 1211 determined for rotation of the region of interest, the region of interest may be rotated based on the second axis 1211. Referring to FIG. 12C, when an area in which the second user input is received corresponds to a point of interest 1222 at which a plane and a third axis 1221 determined for movement of the region of interest meet, the region of interest may be translated based on the third axis 1221.

According to an example embodiment, a user may control a rotation direction and a degree of rotation through the interface. For example, the user may control the rotation direction of the region of interest by controlling a direction of a drag input and control the degree of rotation of the region of interest by controlling a length of the drag input. According to an example embodiment, the user may control a translation direction and a degree of translation through the interface. For example, the user may control the translation direction of the region of interest by controlling the direction of the drag input and control the degree of translation of the region of interest by controlling the length of the drag input.

Referring back to FIG. 1, operation 120 of controlling the position of the region of interest based on the second user input may include at least one of an operation of rotating, based on the second user input, the region of interest about an axis of a direction in which the reference viewpoint for projecting the virtual space faces the point of interest and an operation of moving, based on the second user input, the region of interest in a direction perpendicular to the direction in which the reference viewpoint for projecting the virtual space faces the point of interest.

Figure 12D:
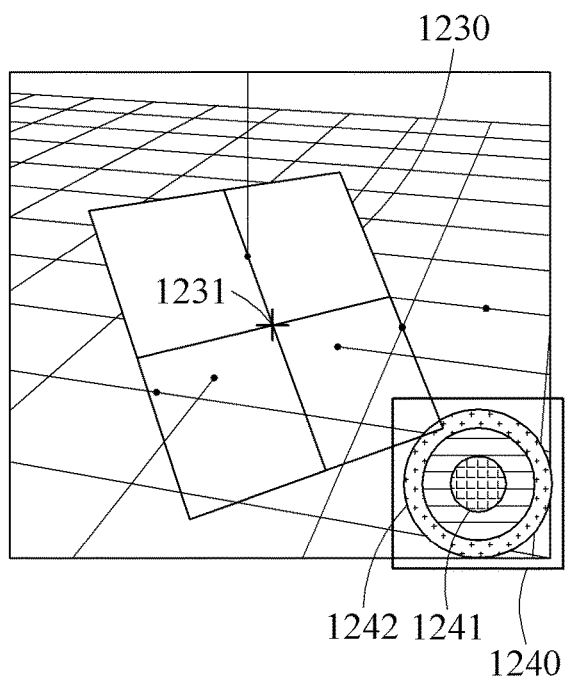

For example, referring to FIG. 12D, a surface 1230 generated in the virtual space may be selected as the region of interest based on the second user input, and an interfacing object 1240 for control of the region of interest in the interface may be activated in response to the region of interest being selected.

According to an example embodiment, the second user input may include an input of manipulating the interfacing object 1240. As an example, the second user input may include an input of manipulating an area of an internal circle 1241 of the interfacing object, and the region of interest 1230 may be moved based on the second user input. Specifically, the user may apply the second user input of dragging the internal circle 1241 of the interfacing object 1240 in a desired direction through the interface. In this case, the region of interest 1230 may be moved in the direction in which the internal circle 1241 is dragged and a direction perpendicular to an axis of a direction in which the reference viewpoint for projecting the virtual space faces a point of interest 1231.

As another example, the second user input may include an input of manipulating an area of an external circle 1242 of the interfacing object, and the region of interest 1230 may be rotated based on the second user input. Specifically, the user may apply the second user input of dragging while drawing a trajectory of an arc having desired direction and length in the area of the external circle 1242 of the interfacing object 1240 through the interface. In this case, the region of interest 1230 may be rotated based on a second input about the axis of the direction in which the reference viewpoint for projecting the virtual space faces the point of interest 1231.

According to an example embodiment, the point of interest is the point in the virtual space corresponding to the position that the reference viewpoint faces as described above, and may be determined to be a point in the region of interest 1230 based on the region of interest 1230 as illustrated in FIG. 12D. Also, as described above, the point of interest may be determined to be at least one of the predetermined point in the virtual space, the point determined based on at least a portion of sketch lines generated in the virtual space, the point determined based on the region of interest, and the point set based on the input of the user.

Referring back to FIG. 1, operation 110 of determining to be the region of interest may include an operation of determining, based on the first user input of generating a curved surface in the virtual space, a curved line extending from the generated curved line to be the region of interest.

According to an example embodiment, when the first user input of selecting a predetermined point in the virtual space is received, a plane including the selected point may be determined to be the region of interest. When the first user input of generating a curved line in the virtual space is received, a curved surface extending from the generated curved line in a direction of a predetermined axis or predetermined straight line may be determined to be the region of interest.

Figure 13A:
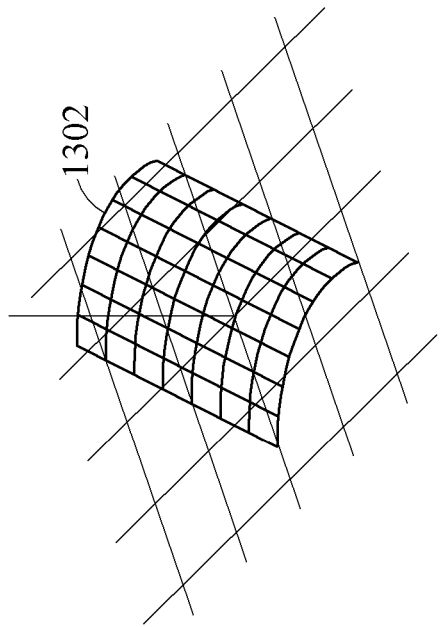
FIGS. 13A through 13D are diagrams for explaining an operation of generating a curved surface determined to be a region of interest based on a user input according to an example embodiment.
Figure 13B:
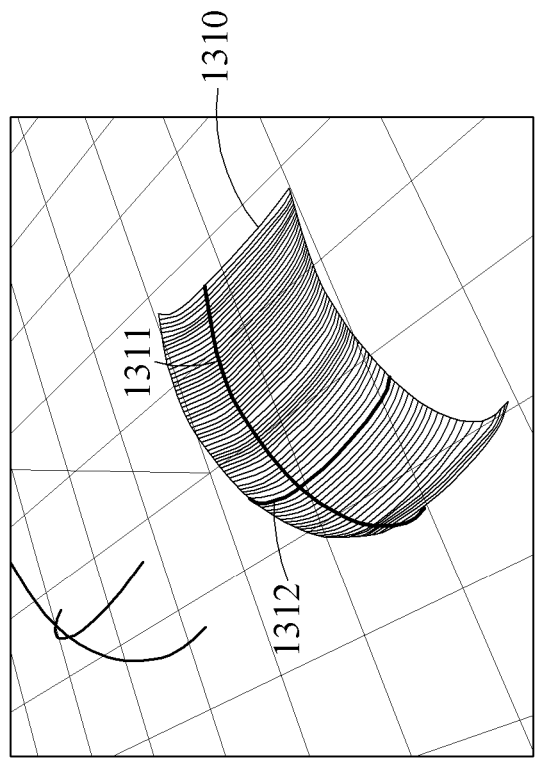
Figure 13C:
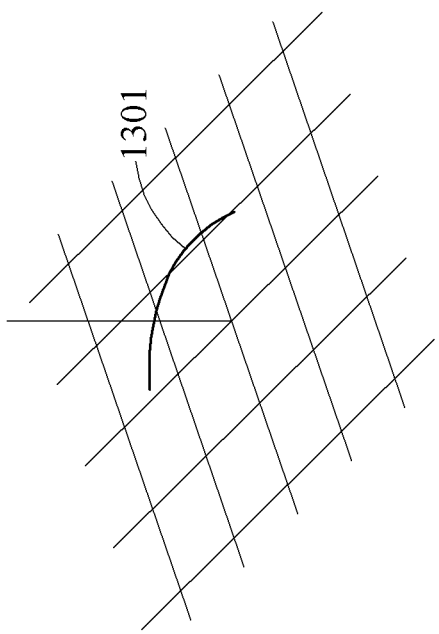
Figure 13D:
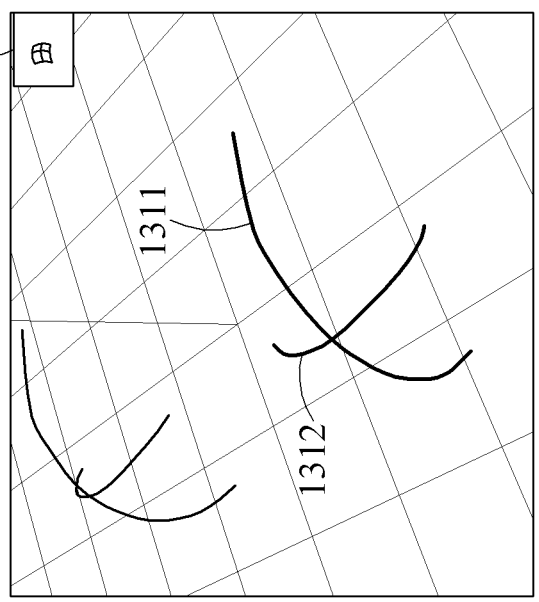

For example, referring to FIG. 13A, the first user input may include an input of generating a curved line 1301 in the virtual space. Here, the curved line may include a straight line. Referring to FIG. 13B, a curved line generated based on the first user input may extend in a direction of a predetermined straight line. For example, the curved line may extend in a direction of a straight line perpendicular to a plane displayed in a viewport in which the curved line is drawn. According to an example embodiment, a curved surface 1302 generated by extending the curved line in a direction of a predetermined straight line may be determined to be the region of interest. Here, the curved surface may include a plane. In other words, when a curved line generated based on a first input is a straight line, a plane extending from the straight line in a direction of a predetermined straight line may be determined to be the region of interest.

According to an example embodiment, the curved surface generated based on the first user input of generating the curved line in the virtual space may be corrected based on a user input for correcting the generated curved surface. As described above, the curved line generated by the first user input may extend in a direction (e.g., direction of predetermined straight line or predetermined curved line) of a first line and generated to be the curved surface. According to an example embodiment, the user input for correcting the generated curved surface may include an input of correcting the first line corresponding to a direction in which the curved line extends.

In an example, operation 110 may include an operation of generating, based on the first user input of generating a first curved line in the virtual space, the curved surface extending from the generated first curved line in the direction of the first line, and an operation of changing the generated curved surface by changing the first line to a second line based on a user input of generating the second line in the virtual space to correct the generated curved surface. For example, the user input of generating the second line to correct the generated curved surface may include an input of selecting an interfacing object for correction of the curved surface and drawing the second line.

According to an example embodiment, in addition to the method of correcting the generated curved surface by drawing the second line, various methods in which a direction and a degree for changing at least a portion of the generated curved surface is specified may be used to correct the generated curved surface.

<Sketch Line Generation and Control>

Figure 14A:
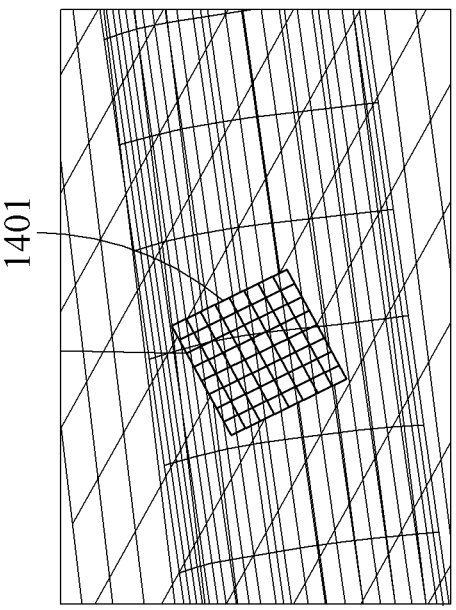
FIGS. 14A through 14C are diagrams for explaining an operation of generating a sketch line belonging to a region of interest according to an example embodiment.

According to an example embodiment, a sketch line belonging to the region of interest may include at least one of a point, a line, and a surface drawn on the region of interest based on a third user input. For example, referring to FIG. 14A, after the curved surface 1302 of FIG. 13B is determined as the region of interest, a user may generate at least one sketch line 1401 in the virtual space through the third user input. For example, the third user input may include an input of drawing a trajectory by dragging a display using a pen that is operatively coupled to the display.

A sketch line generated by a trajectory input through a 2D display may correspond to a point, line, or surface of two dimensions or lower.

Figure 14B:
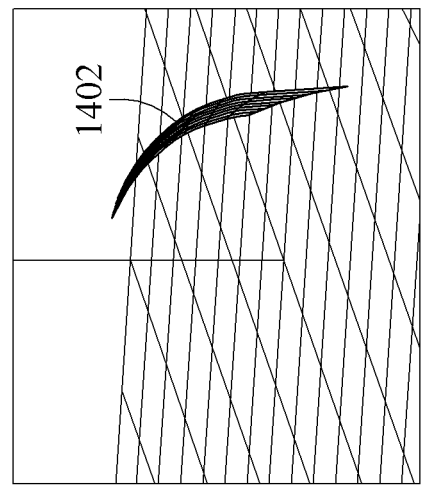

According to an example embodiment, through the interface, the third user input may be generated as a sketch line drawn on the region of interest determined in the virtual space and thus, may be generated as an object located in the virtual space. In other words, by determining a predetermined surface in the virtual space to be the region of interest and generating a sketch line on the region of interest, a 3D shape may be generated in the 3D virtual space displayed on the 2D display. For example, referring to FIG. 14B, at least one sketch line 1402 belonging to the region of interest generated based on the third user input may be generated to be an object having 3D coordinates positioned in the virtual space.

Figure 14C:
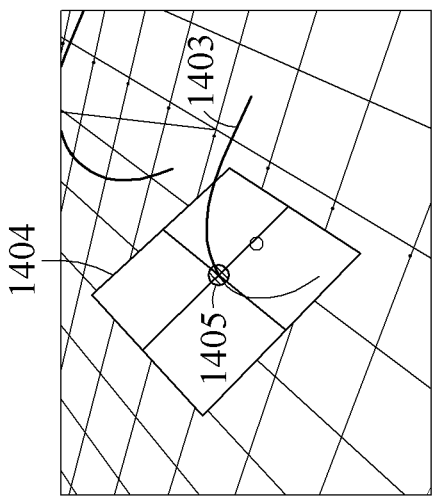

According to an example embodiment, when a sketch line included in the virtual space intersects with the determined region of interest, the interfacing method may further include an operation of visualizing an intersecting point of the region of interest and the sketch line included in the virtual space in the region of interest. For example, referring to FIG. 14C, a sketch line 1403 included in the virtual space may correspond to a sketch line generated to belong to the surface determined as the region of interest before a surface 1404 corresponding to the region of interest is determined at present. When the surface 1404 determined as the region of interest at present intersects with the sketch line 1403 included in the virtual space, an intersecting point 1405 may be visually expressed on the region of interest 1404 to provide an interface for visually acquiring a positional relationship between the sketch line 1403 and the surface 1404 determined as the region of interest with increased ease.

Figure 15C:
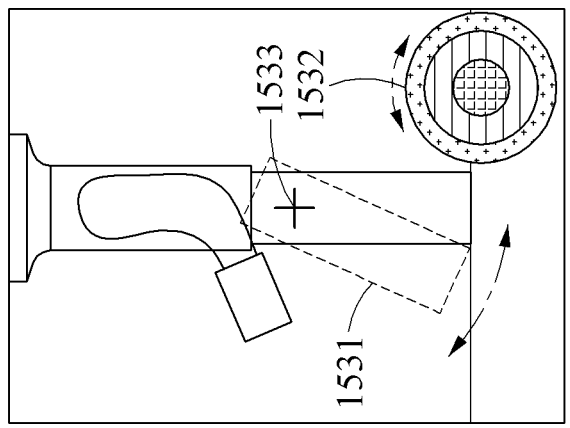
FIGS. 15A through 15C are diagrams for explaining an operation of controlling a sketch line selected based on a user input according to an example embodiment.

According to an example embodiment, the user may generate a first sketch line belonging to a first surface by determining the first surface as the region of interest and generate a second sketch line belonging to a second surface different from the first surface by determining the second surface as the region of interest. Through this, the user may generate a 3D shape located on different planes in the virtual space. For example, FIG. 15A illustrates shapes of sketch lines located on different planes in the virtual space. The sketch lines included in the virtual space may correspond to an object belonging to curved surfaces or planes in the virtual space. A sketch line belonging to a predetermined plane may correspond to a 2D object in a relationship with the corresponding plane. The sketch line belonging to a predetermined plane may constitute a 3D shape along with a sketch line belonging to another plane according to a positional relationship between the corresponding plane and the other plane in the virtual space.

According to an example embodiment, the interfacing method may further include an operation of selecting at least one sketch line included in the virtual space based on a fourth user input and an operation of linearly transforming the selected sketch line based on a point of interest in the virtual space set according to a predetermined rule.

According to an example embodiment, the fourth user input may correspond to an input of selecting sketch lines generated in the virtual space through the interface. The fourth user input may include, for example, an input of touching, clicking, or dragging an area in which a sketch line is displayed through the interface. The selected sketch line may be displayed to be distinguished from a sketch line that is not selected. The sketch line selected based on the fourth user input may be determined to be a target for control.

According to an example embodiment, the sketch line selected based on the fourth user input may be selected in a state in which the region of interest is determined and may also be selected in a state in which the determination of the region of interest is canceled.

The operation of linearly transforming the sketch line selected based on the fourth user input may include an operation of linearly transforming the selected sketch line while maintaining a positional relationship between the selected sketch line and the region of interest based on a position control of the region of interest based on the second user input. Here, the selected sketch line may correspond to a sketch line selected based on the fourth user input in a state in which the region of interest is determined, or a sketch line selected when a predetermined surface is determined to be the region of interest after the sketch line is selected based on the fourth user input.

According to an example embodiment, the position control of the region of interest based on the second user input may include an operation of rotating or moving the region of interest about axes passing the point of interest in the region of interest based on the second user input, or an operation of rotating or moving the region of interest based on an axis of a direction in which the reference viewpoint for projecting the virtual space faces the point of interest. For example, the position control of the region of interest based on the second user input may be moved based on an axis perpendicular to the region of interest and passing the point of interest in the region of interest, and rotated based on an axis included in the region of interest as described above.

According to an example embodiment, in response to the movement or rotation of the region of interest being controlled based on the second user input, the sketch line selected based on the fourth user input may be controlled in movement or rotation so that the positional relationship with the region of interest is maintained. Maintaining the positional relationship between the sketch line and the region of interest may indicate that a position of the sketch line represented based on the region of interest is maintained without a change. For example, a sketch line may be generated as a point at a position apart from the point of interest by a predetermined distance on a straight line passing the point of interest in the region of interest and perpendicular to the region of interest. In this example, even after the region of interest is rotated or moved in response to the region of interest being controlled based on the second user input, the sketch line may be rotated or moved to be located at the position apart from the point of interest by the predetermined distance on the straight line passing the point of interest in the region of interest and perpendicular to the region of interest.

The operation of linearly transforming the sketch line selected based on the fourth user input may include an operation of linearly transforming the selected sketch line based on a fifth user input. Here, the selected sketch line may correspond to a sketch line selected based on the fourth user input in a state in which the region of interest is not determined.

The fifth user input may be an input for linearly transforming the selected sketch line and applied through, for example, an interfacing object activating when a sketch line is selected. The selected sketch line may be linearly transformed based on the point of interest. For example, based on the point of interest, a rotational transformation, a zoom-in transformation, a zoom-out transformation, and a translation may be included. Specifically, the operation of linearly transforming the selected sketch line based on the fifth user input may include at least one of an operation of rotating, in the virtual space, a sketch line selected based on an axis of a direction in which the reference viewpoint for projecting the virtual space faces the point of interest, an operation of moving, based on the fifth user input, a sketch line selected in a direction perpendicular to the axis of the direction in which the reference viewpoint for projecting the virtual space faces the point of interest, and an operation of changing, based on the fifth user input, a size of the sketch line selected in a direction perpendicular to the axis of the direction in which the reference viewpoint for projecting the virtual space faces the point of interest.

For example, referring to FIG. 15A, when at least one sketch line 1501 included in the virtual space is selected as a target for control, an interfacing object 1510 for control of the selected sketch line 1501 may be activated. The fifth user input for linearly transforming the sketch line 1501 selected through the interfacing object 1510 may be received through the interface.

For example, when the fifth user input is received through an area of an internal circle 1512 of the interfacing object, the selected sketch line may be translated in a direction according to the fifth user input and a direction perpendicular to an axis of a direction in which the reference viewpoint for projecting the virtual space faces the point of interest. Specifically, when the fifth user input is an input of left-dragging the internal circle 1512 of the interfacing object, the selected sketch line may be translated leftward based on the direction in which the reference viewpoint faces the point of interest while being perpendicular to the axis of the direction in which the reference viewpoint faces the point of interest.

For example, when the fifth user input is received in a direction from inside to outside the interfacing object or from outside to inside, the selected sketch line may be transformed to be enlarged or retracted. The selected sketch line may be transformed to be enlarged or retracted in the direction perpendicular to the axis of the direction in which the reference viewpoint for projecting the virtual space faces the point of interest.

For example, when the fifth user input is received through an area of an external circle 1511 of the interfacing object, the selected object may be rotationally transformed based on the axis of the direction in which the reference viewpoint for projecting the virtual space faces the point of interest. According to an example embodiment, the rotational transformation of the selected sketch line may be performed based on an axis formed by the reference viewpoint and the point of interest, a viewport may be controlled such that the point of interest is located at a predetermined position of the virtual space, and the position of the reference viewpoint may be controlled. As described above, the user may control the viewport through the interface.

As described above, when at least one sketch line included in the virtual space is selected as a target for control, a predetermined point selected in the virtual space by the user may be set to be the point of interest. In other words, when at least one sketch line included in the virtual space is selected as the target for control, the user may control the position of the point of interest through the interface. For example, the user may control the position of the point of interest in the virtual space by controlling the viewport through the interface.

Figure 15B:
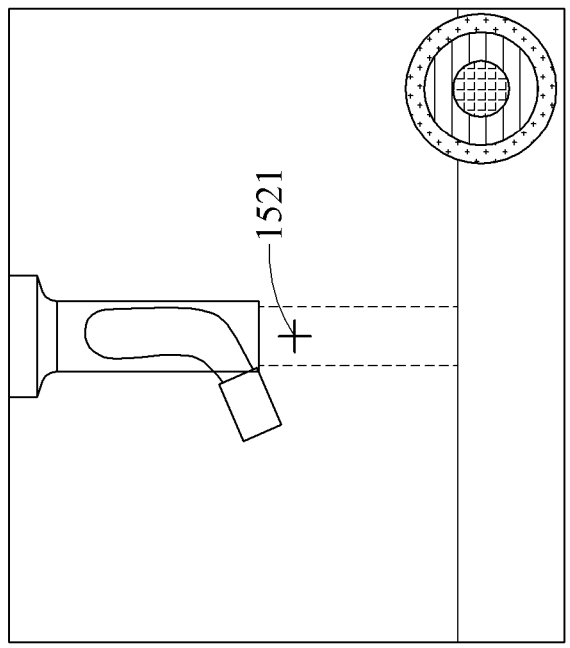
Figure 15A:
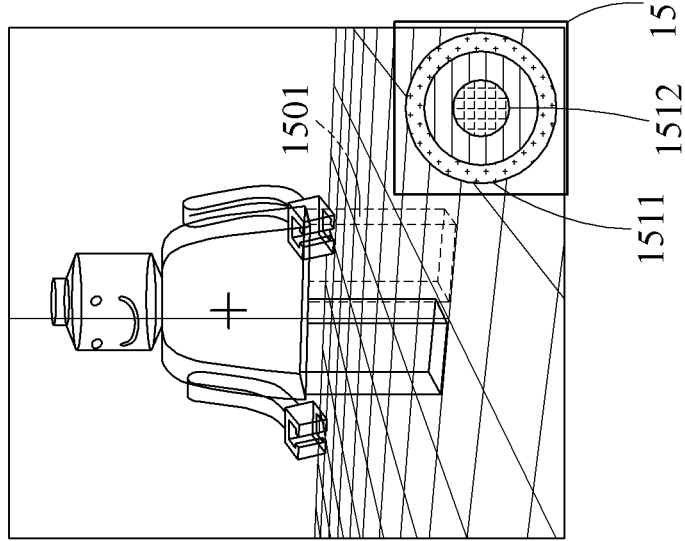

For example, FIG. 15B illustrates a viewport transformed to an orthographic projection through a viewport control. Based on a user input for controlling the viewport, a point of interest 1521 may be determined to be a position selected in the virtual space by the user.

According to an example embodiment, based on the fifth user input, a sketch line selected from sketch lines included in the 3D virtual space may be rotationally transformed based on the point of interest. For example, referring to FIG. 15C, based on the fifth user input of dragging an area of an external circle 1532 of the interfacing object in a predetermined direction, a selected sketch line 1531 may be rotationally transformed based on a point of interest 1533. The fifth user input of transforming the selected sketch line, which is described with reference to FIGS. 15A through 15C is merely an example of an input of controlling a transformation of a sketch line and is not limited to the example.

According to an example embodiment, the interfacing method may further include an operation of selecting at least one sketch line included in the virtual space based on the fourth user input, an operation of designating the selected at least one sketch line as a group, and an operation of setting a point of interest corresponding to the group. At least one sketch line designated as one group may be controlled in the linear transformation of a sketch line based on a point of interest set to correspond to the group. For example, when a group is selected, a sketch line(s) included in the corresponding group may be linearly transformed in units of group based on the fifth user input.

According to an example embodiment, a plurality of groups including at least one sketch line may be designated. An independently corresponding point of interest may be set for each of the plurality of groups. Based on the corresponding point of interest, the linear transformation of a sketch line independently included in the group may be controlled.

According to an example embodiment, at least one sketch line designated to a predetermined group may include position information corresponding to the designated group based on a relative positional relationship with another sketch line included in the designated group. In other words, at least one sketch line designated to a predetermined group may include position information according to a global coordinate system having a predetermined origin in the virtual space and position information according to a local coordinate system based on a relative positional relationship with another sketch line included in the corresponding group to correspond to the group. The global coordinate system may equally apply to sketch lines present in the virtual space. The local coordinate system may apply for each group of sketch lines. For example, coordinates (0, 0, 0) according to the local coordinate system of a first group may correspond to a position different from coordinates (0, 0, 0) according to the local coordinate system of a second group. Instead, the coordinates (0, 0, 0) according to the local coordinate system of a first group may correspond to coordinates (1, 2, 3) according to the global coordinate system.

Referring back to FIG. 1, operation 130 may include an operation of determining a symmetric plane on the virtual space based on a symmetric mode setting, an operation of generating a first sketch line belonging to the region of interest based on the third user input, and an operation of generating a second sketch line symmetrical to the first sketch line based on the symmetric plane in the virtual space.

According to an example embodiment, the symmetric plane may be determined in response to a user input of setting a symmetric mode. The symmetric plane may be determined to be a predetermined plane including a point of interest. For example, the symmetric plane may be determined to be a plane including the point of interest and parallel with an yz plane. In addition, based on various references, a plane including the point of interest may be determined to be the symmetric plane.

According to an example embodiment, when the symmetric mode is set, as the first sketch line is generated in the 3D virtual space, the second sketch line symmetrical to the first sketch line based on the symmetric plane may be generated in the virtual space. In other words, the second sketch line that is a mirror image of the first sketch line with respect to the symmetric plane may be generated in the virtual space to correspond to the first sketch line.

Figure 16:
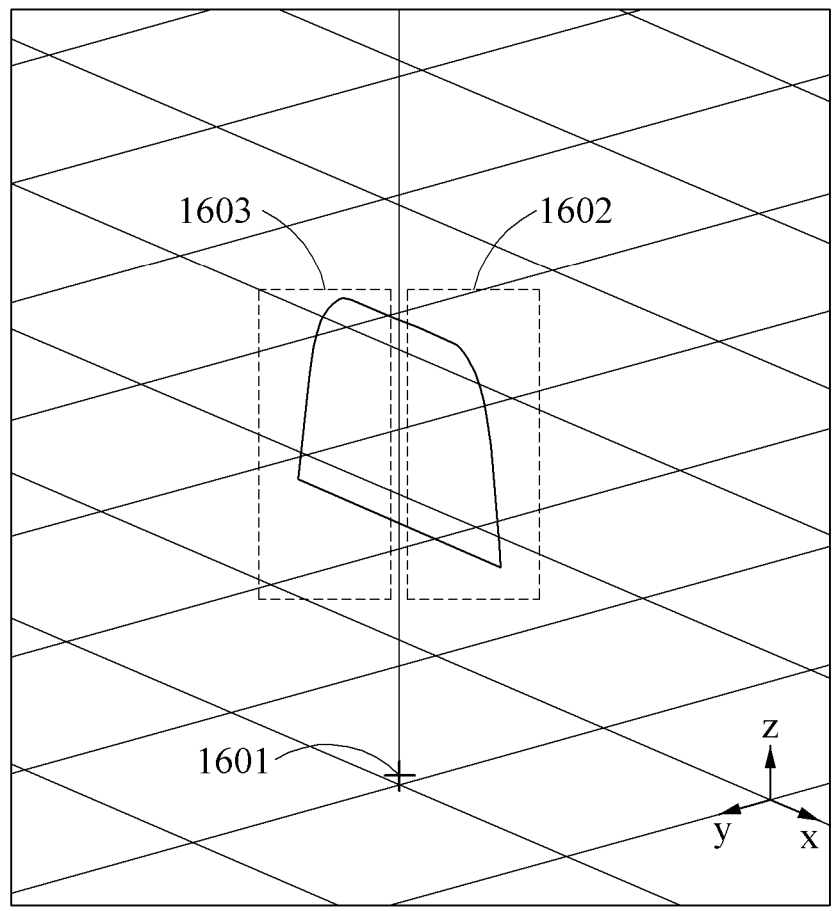
FIG. 16 is a diagram for explaining a symmetric drawing operation according to an example embodiment.

For example, referring to FIG. 16, in response to an input of setting the symmetric mode, a symmetric plane including a point of interest 1601 and parallel with the yz plane may be generated. When a sketch line 1602 is generated on one side of the virtual space divided based on the symmetric plane in response to the third user input, a sketch line 1603 symmetric with respect to the symmetric plane may be generated on the other side of the virtual space divided based on the symmetric plane.

According to an example embodiment, one or more symmetric planes may be generated. For example, at least one of a first symmetric plane parallel to the yz plane based on the point of interest, a second symmetric plane parallel with the zx plane, and a third symmetric plane parallel with the xy plane may be generated in response to the input of setting the symmetric mode. For example, when a horizontal symmetric mode and a vertical symmetric mode are set based on a user input, the first symmetric plane parallel to the yz plane based on the point of interest and the second symmetric plane parallel with the zx plane may be generated. When two symmetric planes are generated, and when a sketch line is generated based on the third user input on one side of the virtual space divided by the symmetric planes, a symmetric image by the symmetric planes may be generated on the other side of the virtual space divided by the symmetric plane.

According to an example embodiment, the interfacing method may further include an operation of selecting at least one first sketch line included in the virtual space based on the fourth user input, an operation of generating a second sketch line by copying the selected first sketch line, and an operation of linearly transforming the second sketch line based on a point of interest in the virtual space set in accordance with a predetermined rule.

According to an example embodiment, the second sketch line generated by copying the first sketch line may correspond to a sketch line determined to have the same shape as the first sketch line. The second sketch line may be generated to belong to a second plane generated at the same position in the virtual space as that of a first plane to which the first sketch line belongs.

According to an example embodiment, when the second sketch line is generated, the second plane to which the second sketch line belongs may be designated to be the region of interest. The second plane designated as the region of interest may be positionally controlled in the virtual space based on the second user input.

According to an example embodiment, when the second sketch line is generated, the first sketch line may be unselected and the second sketch line may be selected. The second sketch line corresponding to the selected sketch line may be transformed with respect to the point of interest based on the fifth user input.

According to an example embodiment, the interfacing method may further include an operation of selecting at least one sketch line included in the virtual space based on the fourth user input and an operation of deforming, based on the fifth user input, a shape of at least a portion of the selected sketch line based on a surface in the virtual space designated by a user. For example, in the selected sketch line, by an input of drawing in or drawing out a predetermined position in the virtual space designated by the user, a partial area of the sketch line corresponding to the position may be deformed based on a movement of the plane.

According to an example embodiment, the interfacing method may include an operation of generating a linear transformation process of the sketch line included in the virtual space as an image. Specifically, the interfacing method may further include an operation of storing a first virtual space including the generated sketch line, an operation of storing a second virtual space including a sketch line obtained by linearly transforming at least a portion of the generated sketch line, and an operation of generating an image including a process of linearly transforming at least a portion of the generated sketch line by rendering the first virtual space and the second virtual space. For example, referring to FIGS. 15B and 15C, by storing the first virtual space including the sketch line of FIG. 15B and storing the second virtual space including the rotationally transformed sketch line 1531 of FIG. 15C, an image including a process of changing sketch lines from a screen of FIG. 15B to a screen of FIG. 15C may be generated.

Figure 17:
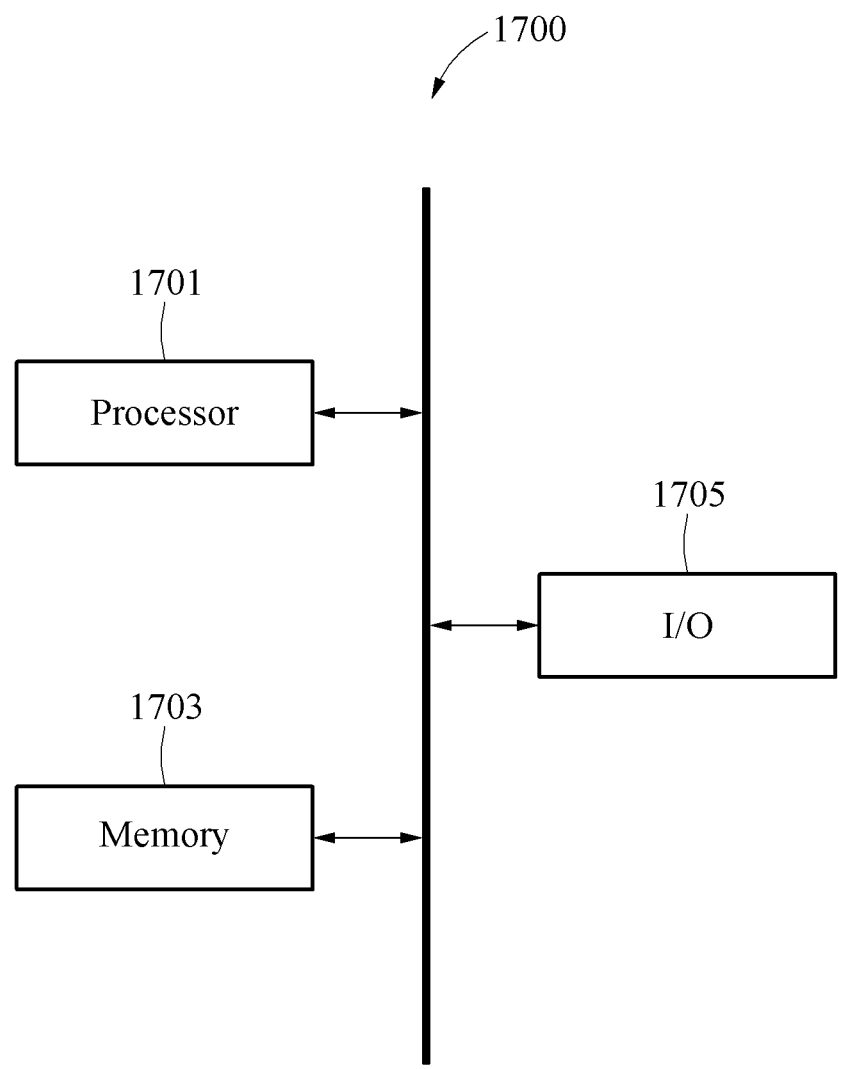
FIG. 17 is a configuration diagram illustrating an electronic apparatus performing an interfacing method according to an example embodiment.

FIG. 17 is a configuration diagram illustrating an electronic apparatus performing an interfacing method according to an example embodiment.

Referring to FIG. 17, an electronic apparatus 1700 includes a processor 1701, a memory 1703, and an input and output (I/O) device 1705.

The electronic apparatus 1700 may be an apparatus that performs the above-described interfacing method and may include a server or a mobile phone, a computer, a tablet PC, an electronic apparatus implementing augmented reality (AR) or virtual reality (VR). The processor 1701 may perform at least one of the methods described with reference to FIG. 1 through FIG. 15C. The processor 1701 may provide a user interface through an output device (e.g., display).

According to an example embodiment, the electronic apparatus 1700 may be connected to an external device (for example, personal computer or network) through the I/O device 1705 and perform data exchange. The I/O device 1705 may include an input device (e.g., touch screen, mouse, keyboard) for receiving a user input and an output device (e.g., display, speaker) for outputting a signal generated in accordance with an operation performed in the electronic apparatus 1700. For example, the input device 1705 may include a touch screen that receives a touch input and use at least one of a capacitive sensor and a pressure-sensitive sensor to sense a touch position (coordinate value), a touch speed, a touch intensity, a touch operation holding time, and the like of a touch input received.

According to an example embodiment, the processor 1701 may perform an operation of the above-described at least one interfacing method based on a user input signal received through the input device 1705. The processor 1701 may provide a signal generated due to an operation performed according to the interfacing method to a user through the output device 1705.

According to an example embodiment, the memory 1703 may store information associated with the above-described interfacing method. The memory 1703 may be a volatile memory or a non-volatile memory. According to an example embodiment, the memory 1703 may store a program in which the above-described interfacing method is implemented or a code of the program. The processor 1701 may execute the program stored in the memory 1703 and control the electronic apparatus 1700.

The example embodiments described herein may be implemented using a hardware component, a software component and/or a combination thereof. A processing device may be implemented using one or more general-purpose or special purpose computers, such as, for example, a processor, a controller and an arithmetic logic unit (ALU), a DSP, a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter.

The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

The invention claimed is:

1. An interfacing method for sketching in a virtual space of three dimensions, the interfacing method comprising:
   generating a surface comprising an area in which a first user input is received in the virtual space;
   determining the surface as a region of interest;
   generating one or more sketch lines belonging to the region of interest based on a second user input;
   selecting one of the one or more sketch lines based on a third user input;
   in response to the third user input being received while a determination of the region of interest is not canceled, linearly transforming the selected sketch line in the virtual space while maintaining a positional relationship with the region of interest based on a fourth user input controlling a position of the region of interest in the virtual space; and
   in response to the third user input being received while the determination of the region of interest is canceled, linearly transforming the selected sketch line in the virtual space with respect to an axis defined by a line connecting a reference viewpoint and a point of interest in the virtual space, based on a fifth user input controlling at least one of a size or a position of the selected sketch line;
   wherein the point of interest is a predetermined point in the virtual space;
   wherein the reference viewpoint is a position of a virtual camera placed in the virtual space to determine a viewport;
   wherein the viewport is a two-dimensional plane onto which the virtual space is projected by the virtual camera.

2. The interfacing method of claim 1, wherein the controlling of the position of the region of interest comprises at least one of:
   rotating, based on the fourth user input, the region of interest in the virtual space about an axis for rotation set to correspond to the region of interest;
   moving, based on the fourth user input, the region of interest in the virtual space about an axis for movement set to correspond to the region of interest;
   rotating, based on the fourth user input, the region of interest about an axis defined by the line connecting the reference viewpoint and the point of interest; and
   moving, based on the fourth user input, the region of interest in a direction perpendicular to an axis defined by the line connecting the reference viewpoint and the point of interest.

3. The interfacing method of claim 1, wherein the determining to be the region of interest comprises at least one of:
  determining, based on the first user input of selecting at least one point in the virtual space, a plane comprising the selected point to be the region of interest; and
  determining, based on the first user input of generating a curved line in the virtual space, a curved surface extending from the generated curved line to be the region of interest.

4. The interfacing method of claim 1, wherein the determining to be the region of interest comprises:
  generating, based on the first user input of generating a first curved line in the virtual space, a curved surface extending from the generated first curved line in a direction of a first line; and
  changing, based on a user input of generating a second line in the virtual space to correct the generated curved surface, the generated curved surface by changing the first line to the second line.

5. The interfacing method of claim 1, wherein the determining to be the region of interest comprises:
  determining, based on the first user input of selecting at least one sketch line generated in the virtual space, a surface comprising the selected at least one sketch line to be the region of interest.

6. The interfacing method of claim 1, wherein the one or more sketch lines belonging to the region of interest comprises at least one of a point, a line, and a surface drawn on the region of interest based on the second user input.

7. The interfacing method of claim 1,
  wherein the point of interest comprises a point in the virtual space corresponding to a center of the viewport, a point determined based on sketch lines generated in the virtual space, a point determined based on a region of interest, and/or a point set based on an input of a user.

8. The interfacing method of claim 1, further comprising:
  generating a second sketch line by copying the selected sketch line; and
linearly transforming the second sketch line based on a point of interest in the virtual space set in accordance with a predetermined rule.

9. The interfacing method of claim 1, wherein the controlling at least one of the size or the position of the selected sketch line comprises at least one of:
  rotating, in the virtual space, the selected sketch line based on the axis;
  moving, in the virtual space, the selected sketch line in a direction perpendicular to the axis; and
  changing the size of the selected sketch line in a direction perpendicular to the axis.

10. The interfacing method of claim 1, wherein the generating of the one or more sketch lines belonging to the region of interest comprises:
  determining a symmetric plane on the virtual space based on a symmetric mode setting;
  generating a first sketch line belonging to the region of interest based on the third second user input; and
  generating a second sketch line symmetrical to the first sketch line based on the symmetric plane in the virtual space.

11. The interfacing method of claim 1,
  wherein selecting the sketch line based on the third user input includes selecting a plurality of sketch lines, and the method further comprises: designating the selected plurality of sketch lines as a group; and
  setting a point of interest corresponding to the group;

wherein each of the selected plurality of sketch lines includes position information according to a local coordinate system based on a relative positional relationship with another sketch line included in the group.

12. The interfacing method of claim 1, further comprising:
  storing a first virtual space comprising the generated sketch line;
  storing a second virtual space comprising a sketch line obtained by linearly transforming at least a portion of the generated sketch line; and
  generating an image comprising a linear transformation process of at least a portion of the generated sketch line by rendering the first virtual space and the second virtual space.

13. The interfacing method of claim 1, further comprising:
  visualizing, when a sketch line included in the virtual space intersects with the region of interest, an intersecting point of the region of interest and the sketch line included in the virtual space in the region of interest.

14. The method of claim 1, wherein generating the surface comprises:
  generating, based on the first user input of generating a first curved line in the virtual space, a curved surface extending from the generated first curved line in a direction of a first line; and
  changing, based on a user input of generating a second line in the virtual space to correct the generated curved surface, the generated curved surface by changing the first line to the second line, wherein the changed curved surface extends from the curved line in a direction of the second line;
  wherein determining to be the region of interest comprises determining the changed curved surface as the region of interest.

15. A non-transitory computer-readable recording medium in which a program for executing the interfacing method of claim 1 is recorded.

16. An electronic apparatus comprising:
  at least one processor,
  wherein the at least one processor is configured to:
    generate a surface comprising an area in which a first user input is received in a virtual space of three dimensions;
    determine the surface as a region of interest;
    generate at least one sketch line belonging to the region of interest based on a second user input;
    select one of the sketch lines based on a third user input;
    in response to the third user input being received while a determination of the region of interest is not canceled, linearly transform the selected sketch line in the virtual space while maintaining a positional relationship with the region of interest based on a fourth user input controlling a position of the region of interest in the virtual space; and
    in response to the third user input being received while the determination of the region of interest is canceled, linearly transform the selected sketch line in the virtual space with respect to an axis defined by a line connecting a reference viewpoint and a point of interest in the virtual space, based on a fifth user input controlling at least one of a size or a position of the selected sketch line;
  wherein the point of interest is a predetermined point in the virtual space;

wherein the reference viewpoint is a position of a virtual camera placed in the virtual space to determine a viewport;

wherein the viewport is a two-dimensional plane onto which the virtual space is projected by the virtual camera.

17. The apparatus of claim 16, wherein the surface is curved.

* * * * *

UNITED STATES PATENT AND TRADEMARK OFFICE
CERTIFICATE OF CORRECTION

PATENT NO. : 12,223,580 B2
APPLICATION NO. : 17/600073
DATED : February 11, 2025
INVENTOR(S) : Yong Kwan Kim, Sang Gyun An and Kyu Hyoung Hong Page 1 of 1

It is certified that error appears in the above-identified patent and that said Letters Patent is hereby corrected as shown below:

In the Claims

Claim 10, Column 25, Line 58, the text "the third second user input" should read --the second user input--.

Signed and Sealed this
Twenty-sixth Day of August, 2025

Coke Morgan Stewart
*Acting Director of the United States Patent and Trademark Office*